PCM SWITCHING STAGE AND ITS ASSOCIATED CIRCUITS

Filed Aug. 17, 1962 15 Sheets-Sheet 1

Inventors
J.G. DUPIEUX
P. SENEQUE
By
Attorney

Inventors
J.G. DUPIEUX
P. SENEQUE
By Paul W. Hemminger
Attorney

Inventors
J.G. DUPIEUX
P. SENEQUE
By [signature]
Attorney

PCM SWITCHING STAGE AND ITS ASSOCIATED CIRCUITS

Filed Aug. 17, 1962 15 Sheets-Sheet 4

Inventors
J.G. DUPIEUX
P. SENEQUE
By [signature]
Attorney

PCM SWITCHING STAGE AND ITS ASSOCIATED CIRCUITS

Filed Aug. 17, 1962 15 Sheets-Sheet 5

Inventors
J.G. DUPIEUX
P. SENEQUE
By Paul W. Hemminger
Attorney

Inventors
J.G. DUPIEUX
P. SENEQUE
By [signature]
Attorney

Inventors
J. G. DUPIEUX
P. SENEQUE
By [signature]
Attorney

PCM SWITCHING STAGE AND ITS ASSOCIATED CIRCUITS

Inventors
J.G. DUPIEUX
P. SENEQUE
By Paul W. Hemminger
Attorney

Inventors
J.G. DUPIEUX
P. SENEQUE
By [signature]
Attorney

Inventors
J.G. DUPIEUX
P. SENEQUE
By [signature]
Attorney

Inventors
J.G. DUPIEUX
P. SENEQUE
By [signature]
Attorney

Inventors
J. G. DUPIEUX
P. SENEQUE
By [signature]
Attorney

Inventors
J.G. DUPIEUX
P. SENEQUE
By [signature]
Attorney

Inventors
J.G. DUPIEUX
P. SENEQUE
By Paul Henninger
Attorney

Inventors
J.G. DUPIEUX
P. SENEQUE
By [signature]
Attorney 3,281,536

PCM SWITCHING STAGE AND ITS ASSOCIATED CIRCUITS

Jacques Georges Dupieux, Issy-les-Moulineaux, and Pierre Seneque, Palaiseau, France, assignors to International Standard Electric Corporation, New York, N.Y., a corporation of Delaware Filed Aug. 17, 1962, Ser. No. 217,636
8 Claims. (Cl. 179—15)

The present invention concerns a switching stage and the associated control circuits for establishing connections between the channels of groups of multiplex trunks.

Generally, the word "multiplex line" will designate a transmission channel on which several communications are simultaneously transmitted in one single direction.

In the time division systems, the *m* informations which are present in analog form in a "transmitting exchange" and which have to be transmitted simultaneously on the line towards a "receiving exchange" are sampled once at each frame period. In the present system described, a frame period of 100 $\mu$s. has been chosen as a non-limitative example.

The amplitude modulated pulses obtained by means of this sampling are quantified and coded in one of the known binary codes and the *m* codes or "messages" are transmitted in timed succession during a frame period.

If one choses $m=25$, a time slot of 4 $\mu$s. is attributed to each channel. It will be noted that the word "channel" involves the idea of relative position with respect to an origin which is materialized by a synchronization code transmitted on the 25th channel.

The receiving exchange comprises a clock which supplies time slot signals referenced *t*1 to *t*25, each one having a duration of 4 $\mu$s. The time slot defined by each one of these signals will be called "channel time slot." In the example under consideration, one chooses a 7 digit non-redundant binary code so that an 8th digit is added to this number which has usually the value 1 but since it has no meaning at all in the message, it is cancelled inside the switching stage.

The "digit time slot" assigned to each one of these eight figures is thus 500 ns. (abbreviation of nanosecond$=10^{-9}$ second).

Each digit time slot is subdivided into 4 equal "basic time slots" of a duration of 125 ns. which are respectively referenced *a, b, c, d.*

The digit time slots will be referenced 1 to 8 and the basic time slot *b* of the digit time slot 3 of the channel time slot *t*12 will be referenced *t*12.3*b*. Since the digits are transmitted in such a channel as the more significant is the first one, the digit time slot 1 corresponds to this latter, the digit time slot 2 to the next less significant digit, etc.

On the other hand, the exchange clock supplies also "shifted channel time slot" signals *t'*1 to *t'*25. These signals are lagging by 4 digit time slots with respect to the signals *t*1 to *t*25, so that their first digit time slot is the digit time slot 5 and their last digit time slot, the digit time slot 4. One has thus: *t*12.4=*t'*13.4; *t*12.5=*t'*13.5; *t*12.8=*t'*13.8; *t*13.1=*t'*14.1; *t*13.5=*t'*14.5 etc.

In the coding process used, the presence of a pulse or "message signal" in a digit time slot, characterizes a digit 1 and the absence of pulse characterizes a digit 0.

In a time division multiplex transmission, the word "trunk" will designate the combination of two multiplex lines conveying the communications in the two directions.

In the study of the switching problems arising in a local exchange or in a transit exchange, the word "one-way trunk" will designate a trunk which is particularized by the direction of propagation of the calls; and the word "two-way trunk," a trunk on which calls may be transmitted in the two transmission directions.

In the description it is assumed that the trunks used are two-way trunks. The case of one-way trunks would be treated in the same channel within the framework of the present invention.

The object of the present invention is thus to achieve circuits enabling to establish and to release connections in a pulse code modulation multiplex switching stage.

The invention will be particularly described with reference to the accompanying drawings in which.

*General description*

This is a pulse-code modulation central exchange. The switching stage is a matrix with trunks connected to its inlets and outlets. The time of arrival and departure of intelligence data is independent of internal switching time slots. The bidirectional transfer of data through the switching matrix is accomplished during a given time slot and is controlled by code signals which are read out at the beginning of a time slot. The selection of a crosspoint occurs by an interpretation of code signals stored in space path stores associated with the trunks. Each store has as many lines as there are channels. The control codes stored in the path store are cyclically read at the central exchange time by a local clock.

Figure 2:
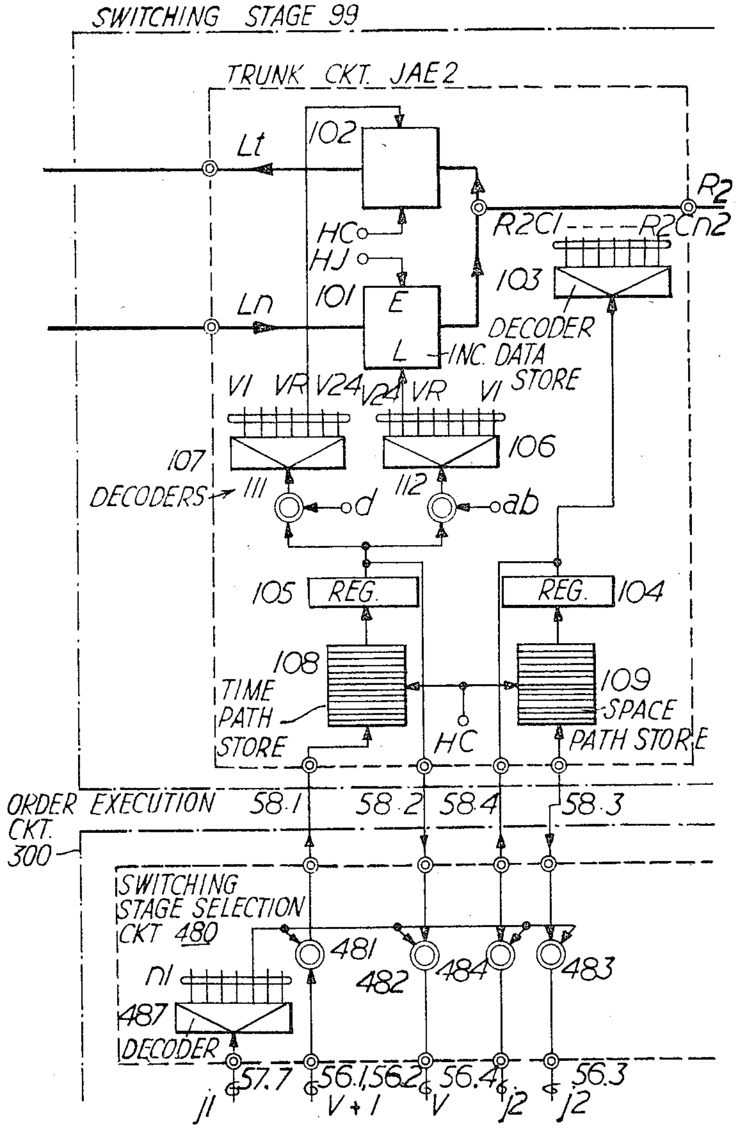
FIGURE 2 shows a circuit diagram of the connecting circuits involved in a connection and the selection circuit of the path stores.
Figure 2A:
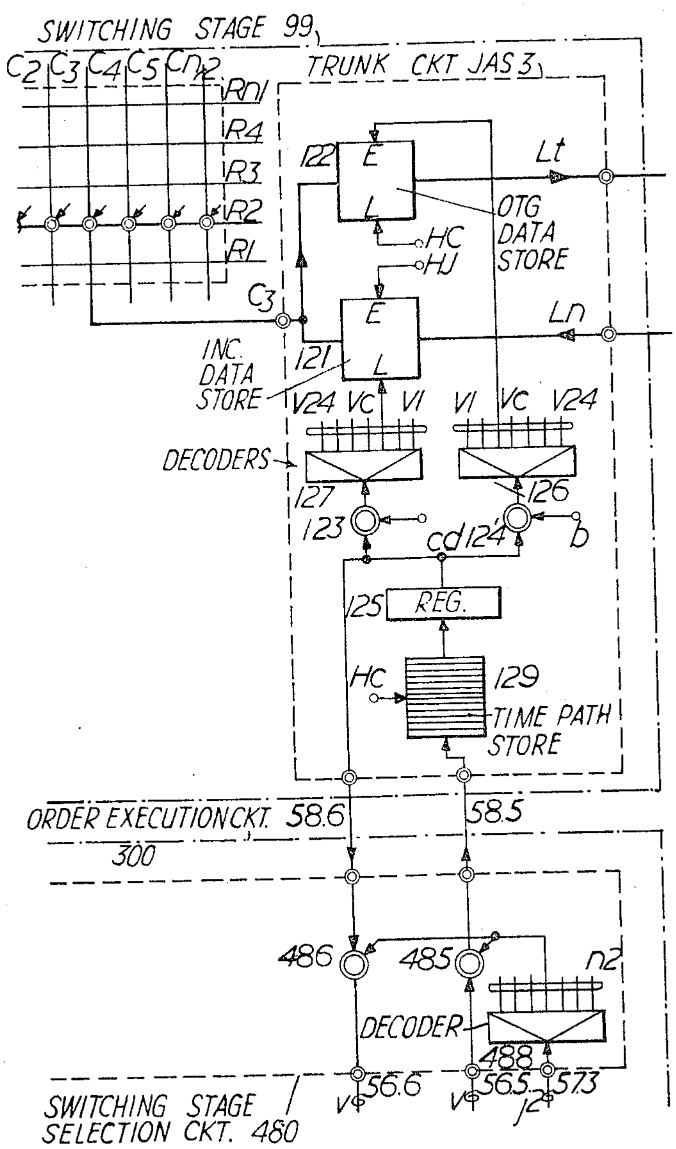
Figure 3:
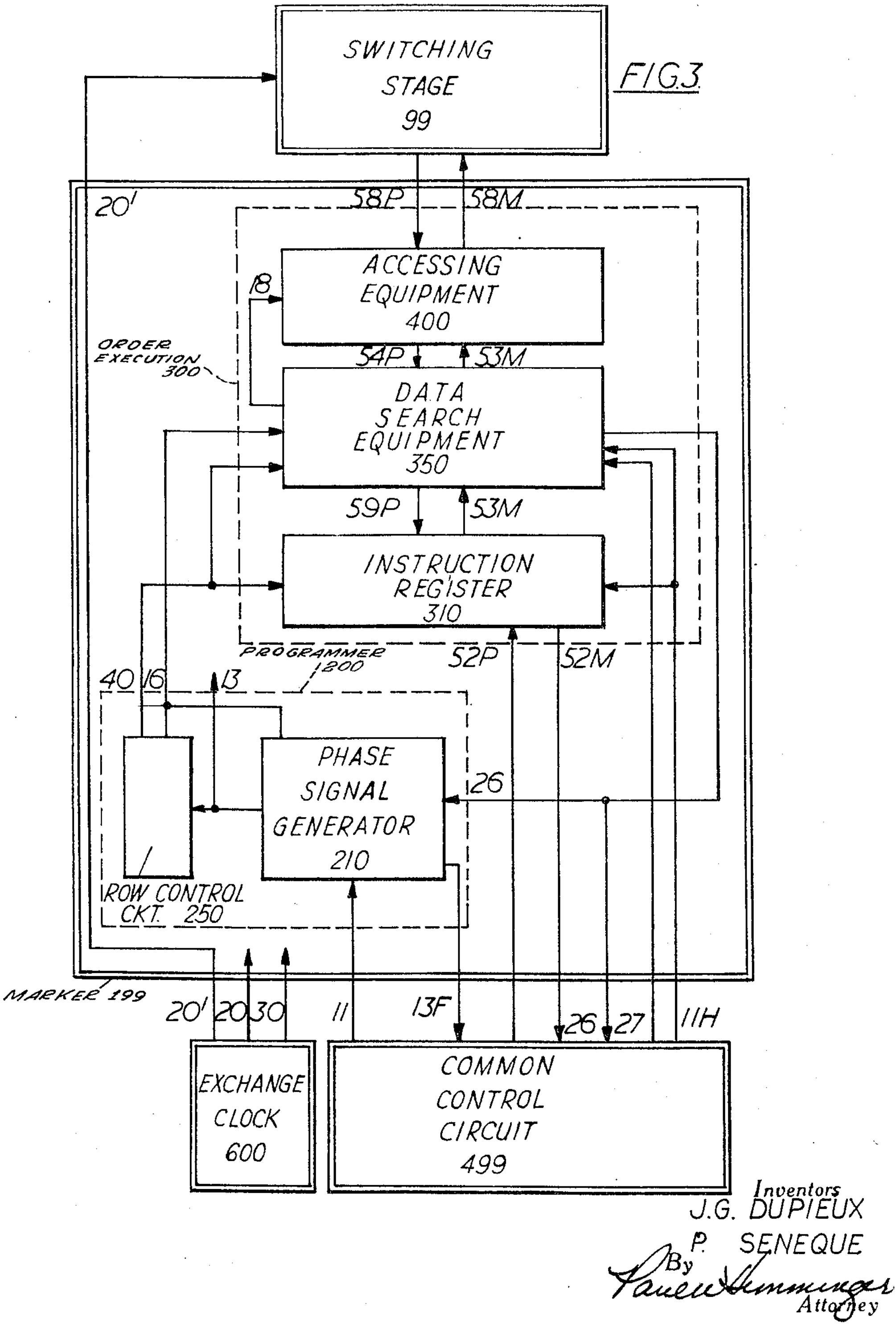
FIGURE 3 shows a general diagram of the whole assembly of the connection control circuits associated to the switching stage.

A general understanding of the invention may be had by a study of FIG. 3. Telephone subscriber lines are connected to the switching network 99 appearing at the top of the drawing. (The lines themselves appear at LT and LN at the top of FIG. 2.) A marker 199 controls the switching network 99 via conductors 58P, 58M. The marker 199 is in turn driven by an exchange clock 600 and controlled by a common control circuit 499.

The marker 199 is divided into two principal parts by dashed line boxes 200, 300. One of these boxes, 200, is a programmer for controlling the sequence of events required to establish a call. The other box, 300, is an order execution circuit which follows the commands emanating from the programmer.

The switching network is comprised of a plurality of rows and columns arranged to form switching crosspoints which are identified by codes. The codes relate to the time when a call is established, the identity of the trunk or line, and the identity of the channel used. The codes are originally stored in a matrix (FIG. 4) in the network 99 which is scanned by the exchange clock (as indicated by line 20').

While a call is being set-up, the common control circuit 499 receives signals which identify the various call functions. Some of the required information may be missing. If so, the common control circuit 499 requests a data search equipment 350 to make a search for the missing information under the control of the programmer circuit 200. The programmer is, in turn, controlled from the common control circuit 499 acting through the pulse signal generator 210. After the missing data is found, it is sent to the common control circuit 499. The common control circuit 499 transfers the call data over conductor 52P to an instructional register 310 where it is stored.

Finally, the order execution circuit 300 is commanded over conductors 13 to perform the required functions. These commands involve such things as a selection of the required switch path, code searching or modification.

These and the remaining functions will become more apparent from a study of the drawings in greater detail.

*Symbology*

Before undertaking the description of the invention, the principle of notations in logical algebra will be briefly stated, this principle being that used in some cases in order to simplify the writing when describing logical operations. The subject is comprehensively treated in several papers, and in particular in the book "Logical Design of Digital Computers," by M. Phister.

If a condition characterized by the presence of a signal is written A, the condition characterized by the absence of the said signal will be written $\overline{A}$. These two conditions are connected by the well known logical relation $A \; x \; \overline{A}=0$ in which the sign "$x$" is the symbol of the coincidence logical function or AND function.

If a condition C appears only if conditons A and B are present simultaneously, one writes $A \; x \; B=C$ and this function is achieved through a coincidence gate or AND circuit.

If a condition C appears when at least one of the two conditions E and F is present, one writes $E+F=C$ and this function is achieved through a mixing gate or OR circuit.

Since these logical functions AND and OR are commutative, associative and distributive, one may write $$A+B=B+A; \; A \; x \; (B+C)=AB+AC;$$

$$(A+B)(C+D)=A \; x \; C+A \; x \; D + B \; x \; C+B \; x \; D; \text{ etc.}$$

Also, a function of two variables A and B may present four possible combinations, and if one writes A $x$ B, the whole of the three others is represented by the expression $\overline{A \; x \; B}$.

The meaning of the symbols used in the drawings of the present description will also be defined.

Figure 1:
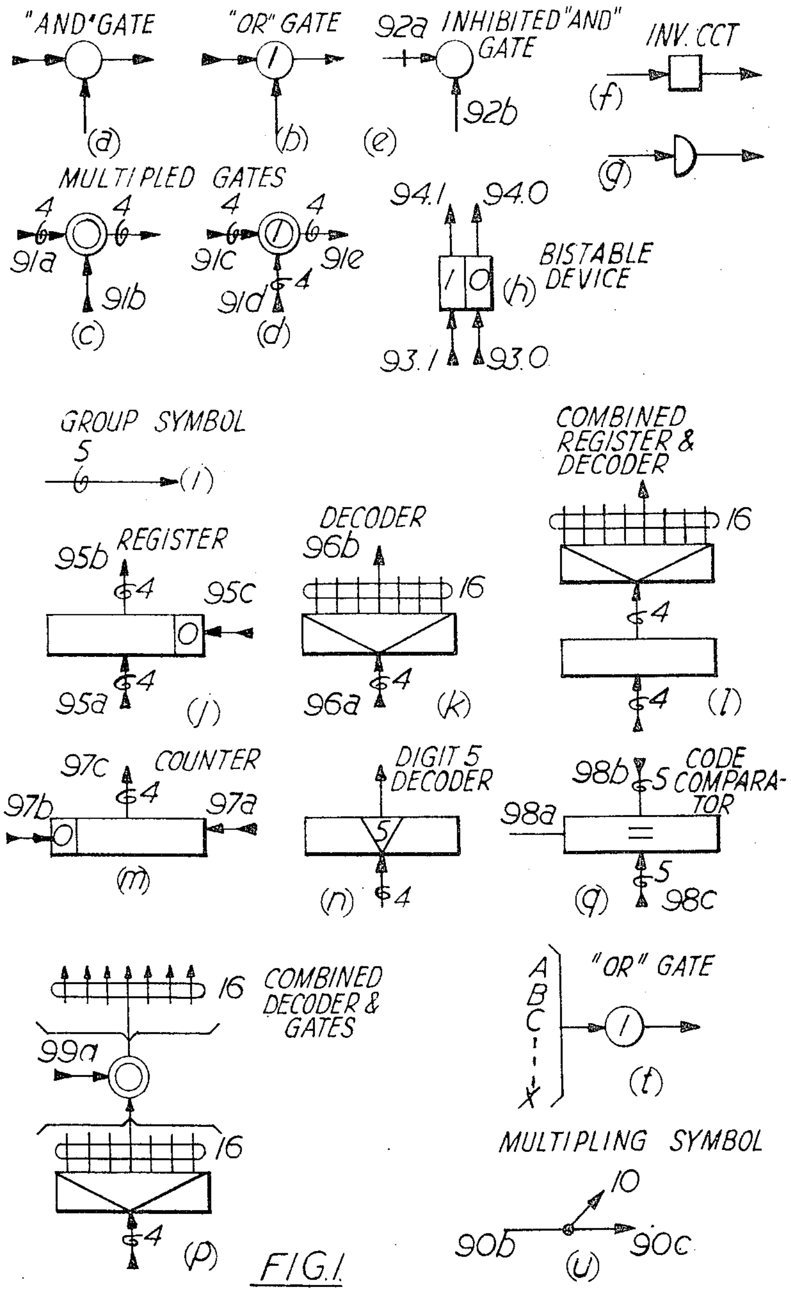
FIGURE 1 shows the different particular symbols used in the following figures.

FIGURE 1 shows the different particular symbols used;

FIGURE 1(*a*) shows a single AND circuit;

FIGURE 1(*b*) shows a single OR circuit;

FIGURE 1(*c*) shows a multiple AND circuit, i.e. comprising, in the illustrated example, four AND circuits one of the inputs of which is connected to each one of the conductors **91*a* and the second input of which is connected to a common conductor 91*b***;

FIGURE 1(*d*) shows a multiple OR circuit which comprises, in the illustrated example, four two-input OR circuits (**91*c* and 91*d*) whose outputs on the four output conductors 91*e*** are the same signals as those applied to either one or the other inputs;

FIGURE 1(*e*) shows an AND circuit having two inputs **92*a* and 92*b* and which is blocked when a signal is applied on the input 92*a***;

In this figure an input of an AND circuit is energized when a signal is applied on said input and the AND circuit is activated if all its inputs are simultaneously energized;

FIGURE 1(*f*) represents an inverter circuit;

FIGURE 1(*g*) represents a time delay circuit;

FIGURE 1(*h*) represents a bistable circuit or flip-flop to which a control signal is applied on one of its inputs 93–1 or 93–0 in order to set it respectively to the 1 state or to the 0 state. A voltage of same polarity as the control signal is set up on the output 94–1 when the flip-flop is in the 1 state and on the output 94–2 when it is in the 0 state. If the flip-flop is referenced B1, the logical condition characterizing the fact that it is in the 1 state will be written B1, whereas the logical condition characterizing the fact that it is in the 0 state will be written $\overline{B1}$;

FIGURE 1(*i*) shows the symbol for a group of several conductors, five in the example considered;

FIGURE 1(*j*) shows a register with flip-flops. In the case of the figure it comprises 4 flip-flops the inputs 1 of which are connected to the conductors of the group **95*a* and the outputs 1 of which are connected to the group of conductors 95*b*. The digit 0, placed at one end of the register, indicates that the register is reset to zero when a signal is applied on the conductor 95*c***;

FIGURE 1(*k*) shows a decoder, which, in the illustrated example, transforms a 4 digit binary code applied by the group of conductors **96*a* into a code 1 out of 16. In this case a signal appears on only one out of the 16 conductors 96*b*** for each one of the numbers applied to the input;

FIGURE 1(*l*) shows the combination of a register and a decoder;

FIGURE 1(*m*) shows a counter with flip-flops which counts the pulses applied on its input **97*a* and which is reset to zero by the application of a signal on its input 97*b*. The outputs 1 of the flip-flops are connected to the output conductors 97*c***;

FIGURE 1(*n*) shows a decoder which is conditioned in such a channel as it delivers an output signal only when the binary number, the decimal equivalent of which is 5, is applied to it;

FIGURE 1(*p*) shows a decoder with 16 outputs with insertion of a group of 16 AND circuits which are activated when a signal is applied on their input **99*a***;

FIGURE 1(*q*) shows a code comparator which delivers a signal on its output **98*a* when the 5 digit codes applied on its inputs 98*b* and 98*c*** are identical;

FIGURE 1(*t*) shows a single OR circuit comprising a certain number of inputs on which one of the conditions A, B, C . . . X may appear;

FIGURE 1(*u*) shows a multiplying of conductors and represents 10 conductors identical to conductor **90*c*** being connected in parallel.

In the course of the description, the expression "group of conductors" will be often used. This expression characterizes:

Either a certain number of conductors each one assigned to the transmission of a particular signal, the different signals presenting a certain common characteristic;

Or a certain number of conductors assigned to the transmission of a binary code. Thus, a group of conductors assigned to the transmission of the channel time slot codes will comprise $v$ conductors.

*Detailed Description*

FIGURE 2 shows a switching stage 99 having interconnecting equipment located between two trunks referenced JAE2 and JAS3. The switch 100 placed in this stage comprises the rows R1 to R*n*1 and the columns C1 to C*n*2. The trunk JAE2 is connected to the row R2 and the trunk JAS3 to the column C3.

Each one of these trunk circuits comprises an incoming line L*n* on which arrive the message coming from outside the exchange and an outgoing line L*t* on which are transmitted the messages originating from an incoming line after passage in the switch 100.

It will be assumed, that a subscriber calling on the channel V*e* of the trunk JAE2 is connected with a called subscriber connected to the channel V*s* of the trunk JAS3. The information characterizing this connection are numbers or "codes" which, after decoding control the selection of the two trunks and, in each one of these, the channel on which the said connection is transmitted. By definition, a connection occupies the same channel both on the incoming line and the outgoing line of a given trunk. This connection is set up during one of the channel time slots *t*1 to *t*24 defined by the exchange clock.

The incoming line of each one of the trunks, has a buffer store or "data store" connected thereto. The incoming line is represented on the figure by squares referenced 101 in JAE2 and 121 in JAS3. These stores are required since the channel time slot of transmission of the communication in the switch is generally different from that at which it arrives and, this data store effects any time conversion necessary.

Similarly, a second data store is connected to the outgoing line circuit so that the order of the channels on the line are independent of the channel time slot of the setting up of the connection. This outgoing data store is referenced 102 in JAE2 and 122 in JAS3.

The trunks JAE2 and JAS3 are connected through the switch and the connection is set-up by means of a single conductor on which the messages belonging to the two channels of transmission are transmitted in time distribution. Thus, if the transmission is carried out in a series mode, each digit time slot of the channel time slot *t*Z of setting up of the connection is divided into two equal time intervals, *m'* and *m''* respectively assigned to the transmission from JAE2 towards JAS3 and to the transmission from JAS3 to JAE2.

Since the data to be transmitted through the switching stage and related to the noted connection, is registered in the data stores 101 and 121, the following are completed operations during the time *t*Z:

(1) The setting-up of the connection between the conductor R2 multipled to the outputs of the data stores of the trunk JAE2 and the conductor C3 multipled to the outputs of the data stores of the trunk JAS3, and (2) The bi-directional transfer of data between the incoming line and the outgoing line data stores are completed during the time *m'* when transfer is accomplished between the stores 101 and 122, and during the time *m''* when transfer is accomplished between the stores 121 and 102. The setting up of the connection between the conductors R2 and C3 of the switch is effected by the activation, during the time *t*Z, of a switch crosspoint gate connecting these two conductors.

This crosspoint gate is energized by a signal supplied by the interpretation, in the decoder 103, of an instruction stored in an instruction register 104 associated with the trunk JAE2 which has been extracted, at the beginning of the time *t*Z, from the "space path store" 109. The instruction consists of the code of the trunk JAS3.

The transfer of data is obtained by selecting locations in the data stores. These locations register the data relative to the channel V*e* in the trunk JAE2 and the data relative to the channel V*s* in the trunk JAS3 in order to enable the read-out in the incoming line stores 101 and 121 and the write-in in the outgoing line stores 102 and 122.

In the trunk JAE2, for instance, the address selection is obtained by the interpretation, in the decoders 106 and 107 associated respectively to the stores 101 and 102, of an instruction stored in an instruction register 105 and which has been extracted at the beginning of the time *t*Z from the "time path store" 108. The instruction is constituted by the code of the channel V*e*.

The address selection in the trunk JAS3 is obtained in an identical channel, by means of the circuits 125 to 128 and the store 129 the instruction being constituted by the code of the channel V*s*.

To sum up, the connection taken as an example is set up by utilizing the following information: (1) the time of setting up *t*Z (2) the codes of the trunk JAE2 and JAS3, and (3) the codes of the channels V*e* and V*s*. The three last informations are extracted from a path store at the time *t*Z, and the trunk code JAE2 is directly used with the fact that the decoder associated to the space path store is placed in this trunk circuit and that it can thus select a particular one of all the cross points R2C1 to R2C*n*2 placed on row R2 of the switch.

According to a characteristic of the invention, all the information related to connections is recorded in stores placed in the trunk circuits and all of the connections are set up in time succession without any external intervention.

The organization of the path stores and of the data stores will be briefly described.

The path stores have been shown on FIGURE 2 by horizontally lined squares which comprise, $m-1$ rows, (24 rows) assigned in order, to the channel time slots *t*1 to *t*24 at the exchange time. These stores comprise the number of columns necessary for the inscription of trunk codes in the space path stores and for the inscription of channel codes in the time path stores.

Assuming that the instructions have been previously registered in the stores, the read-out operation is carried out in parallel form and in a cyclic order with the row addresses being selected in the order *t*1 to *t*24. The exchange clock plays thus the role of an ordinal counter. This channel of reading has been shown symbolically in FIGURE 2, by an inscription "HC" placed on the side of each of the stores.

Thus, if one considers a trunk such as JAE2 connected to one row, at each channel time slot, the trunk code stored in the associated space path store 109, is read and by operation of the decoder 103, effects the selection of one of the cross-points R2C1 to R2C*n*2.

In the same way, for each one of these channel time slots, the channel codes registered on the corresponding rows of the time path stores associated to the connected trunks by the selection of the cross-point effect the bi-directional transfer of data-related to the connection set-up.

The detailed description of the path store will be given hereinafter in conjunction with the FIGURE 4.

The data stores comprise also $m-1$ or 24 rows, which are assigned, in order, to the inscription of the messages transmitted on the channels 1 to 24 of the trunk.

This mode of inscription has been shown symbolically, in FIGURE 2, by an arrow referenced HJ placed on one of the sides of the stores 101 and 121. The letter "E" placed inside of the square representing the store indicates that these trunk time signals are used for the writing.

As previously noted, the messages are transmitted outwardly in a fixed order according to the then channel time slot of the connection set up. The reading of the outgoing line data stores 102 and 122 is carried out in a cyclic channel, but, in this case at the exchange time *t*1 to *t*24. This is shown symbolically, in the FIGURE 2 by an arrow referenced "HC" in front of which is written the letter "L" for "read-out."

The outputs of the incoming line and outgoing line data stores are mixed together and the selection of the addresses is obtained by the interpretation, at each channel time slot, of an instruction extracted from the time path store. The reading of an incoming line data store and the writing in an outgoing line data store, are thus carried out at the exchange time in an acyclic order different than that determined by the ordinal counter.

As it has been indicated previously, each direction of transmission occupies, in the switch 100, a fraction of a digit time slot. For instance, the transmission from JAE2 towards JAS3, may be carried out at the basic time slots *a* and *b* of each digit time slot, and the transmission from JAS3 towards JAE2 at the basic time slots *c* and *d*. These times are delimited by the multiple AND circuits 112 and 123 which control the operation of the decoders 106 and 127 associated to the incoming data stores. For reasons due to the type of store used, the multiple AND circuits 111 and 124 which control the operation of the decoders 107 and 126 associated to the outgoing data stores are activated only respectively at the basic time slots *d* and *b*.

It will be noted, that in the above discussion, the selection of a cross-point is carried out from a space path store, which has been located, in the trunk circuit JAE2. The trunks connected to the rows or "row trunks" are thus particularized with respect to the trunks connected to the columns or "column trunks."

In all the cases, the bi-directional transfer of data relative to a connection is carried out, by the interpretation of instructions stored on the line Z of the path stores of the two trunks.

If JR and JC designate the codes of the column and of the row trunks to be connected, and VR and VC the codes of the channels in these trunks which will be occupied by this connection, it is thus necessary, in order to set up a connection, to register the codes JC, VR, VC on the lines Z of the path stores of the trunks JC and JR. In the same channel, in order to release this connection, these codes will have to be deleted on the lines Z of the path store of the trunks JC and JR. This release can be effected by registering the code zero in the path stores.

When such a switching stage is used in a telephone or telegraph switching system, the setting-up of the connection between the two trunks, is carried out by means of a "traffic connection" between the calling subscriber channel and the called subscriber channel. The setting up of such a traffic connection requires the setting up and the cutting off of a certain number of "service connections" which enable a centralized control device or "common control circuit" to receive informations related to this traffic connection. The same may happen for the cutting-off of a traffic connection.

In a particular channel of a telephone system which makes use of such a switching stage, one may realize that the setting-up of a traffic connection between a channel on the trunk connected to the calling subscriber and a channel on the trunk allowing access to the called subscriber requires the following operations:

(1) Detection of the call (call detector).

(2) Setting-up of a service connection between the calling subscriber and an information exchange device connected to the switch in the same channel as a trunk (call register).

(3) Setting-up of a service connection between an information exchange device connected to the switch and the called subscriber ("sender-receiver").

(4) After transmission to the common control circuit of the informatiton received by the auxiliary circuits, breaking of the service connections and setting-up of the traffic connection.

For each one of these operations of setting-up and breaking, whether they concern a traffic connection or a service connection, the common control circuit receives from its associated devices (call detectors, call registers, and sender-receivers,) either the whole of the required information or only part of this information.

In the first case, the common control circuit transmits this information as "initial data" to a "marker stage," while at the same time it orders the performance of a "code modification" operation in the path stores of the trunks of which it has just given the codes. This operation proceeds under the control of a programme placed in the marker stage.

In the second case, one or several of the informations is missing and the common control circuit transmits, to the marker stage, the initial data it holds while at the same time it orders the achievement of an operation of "data search" in some path stores. This operation proceeds also under the control of a programme placed in the marker stage. When the initial data is completed, it may be brought back to the common control circuit which initiates then a code modification operation.

The code modification orders are referenced A for the connection setting-up order and B for the connection breaking order and they can be generated by the common control circuit only if the informations are completed.

The data search orders are referenced E for the search order for a free channel time slot common to two trunks, C for the search order for a free channel in a trunk, and D for the path identification order, which is the order which permits the determination of the channel time slot at which the channel is connected and the identity of the trunk and of the channel to which it is connected.

In order to set-up or to cut-off a connection, the marker stage must carry out a number of successive operations. This corresponds for instance to the sending, by the common control circuit, successively of the orders C, E and A (for the setting-up of a connection) or of an order D followed by an order B (for the breaking of a connection).

FIGURE 3 shows a block diagram of the whole assembly of the circuits associated with the switching stage 99, and include common control circuit 499 and marker stage 199.

The marker stage comprises, first, a programming block 200, wherein the phase signals generator 210 elaborates the phase signals of the programmes related to the different orders received from the common control circuit and, second, an order execution block 300 wherein the operations controlled by said phase signals are performed.

As previously noted, the initial data and the corresponding order are transmitted from the common control circuit to the marker stage, these informations being sent respectively on the groups of conductors 52P, connected to the group of instruction registers 310 and 311, connected to the generator 210. The elaboration of the phase signals in the generator 210 depends of the received order, and is effected in accordance with the time signals delivered by the exchange clock 600 on the group of conductors 20, and with the informations received from the other circuits of the marker stage over the conductors 16, 25 and 26.

There are two kinds of phase signals: the operation signals and the execution signals.

The operation signals are distributed to the order execution block 300 on the group of conductors 13, and the execution signals are transmitted, to the common control circuit on the conductor 13F.

Each one of the operation signals controls simultaneously, the performance of two different types of marker stage operations:

The first type of operation consists in the selection of the path stores of a row trunk and/or of the time path store of a column trunk by the interpretation of either one or two initial data (trunk codes) registered in the block 310. This type of initial data is materialized under the form of a *j1* digit number for a row trunk code and under the form of a *j2* digit number for a column trunk code.

The second type of operation consists in one of the following operations:

(a) A data search operation using the codes registered on the lines of certain path stores of the selected trunks, the codes being read in a cyclic channel at the exchange time. The data obtained or "results" are either a marked channel time slot (*t*C, *t*D), or one or several channel or trunk codes, or a particular signal. The expression "marked channel time slot" designates a signal having a duration of one channel time slot and which reappears, at each frame period, by occupying the same channel time slot.

(b) An inscription operation placing, and of a column trunk either the zero code or initial data extracted from the block 310 in the path store of a row trunk and of a column trunk. This operation is called "a code modification operation." An execution signal, generated by the generator 210 when all the operation phases of a given order are performed, is transmitted by the marker circuit to the common control circuit on the conductor 13F. This signal indicates that the results of the operation just ended are available. The common control circuit may then either control the transfer, on the groups of conductors 52M and 26, of these results in its registers, then the resetting to zero of the marker circuits, or control directly a new operation by using the results of the preceding operation.

Before undertaking the detailed description of the diagram of FIGURE 3, the manner in which the operations of code modification are carried out in the path stores will be described.

Figure 4:
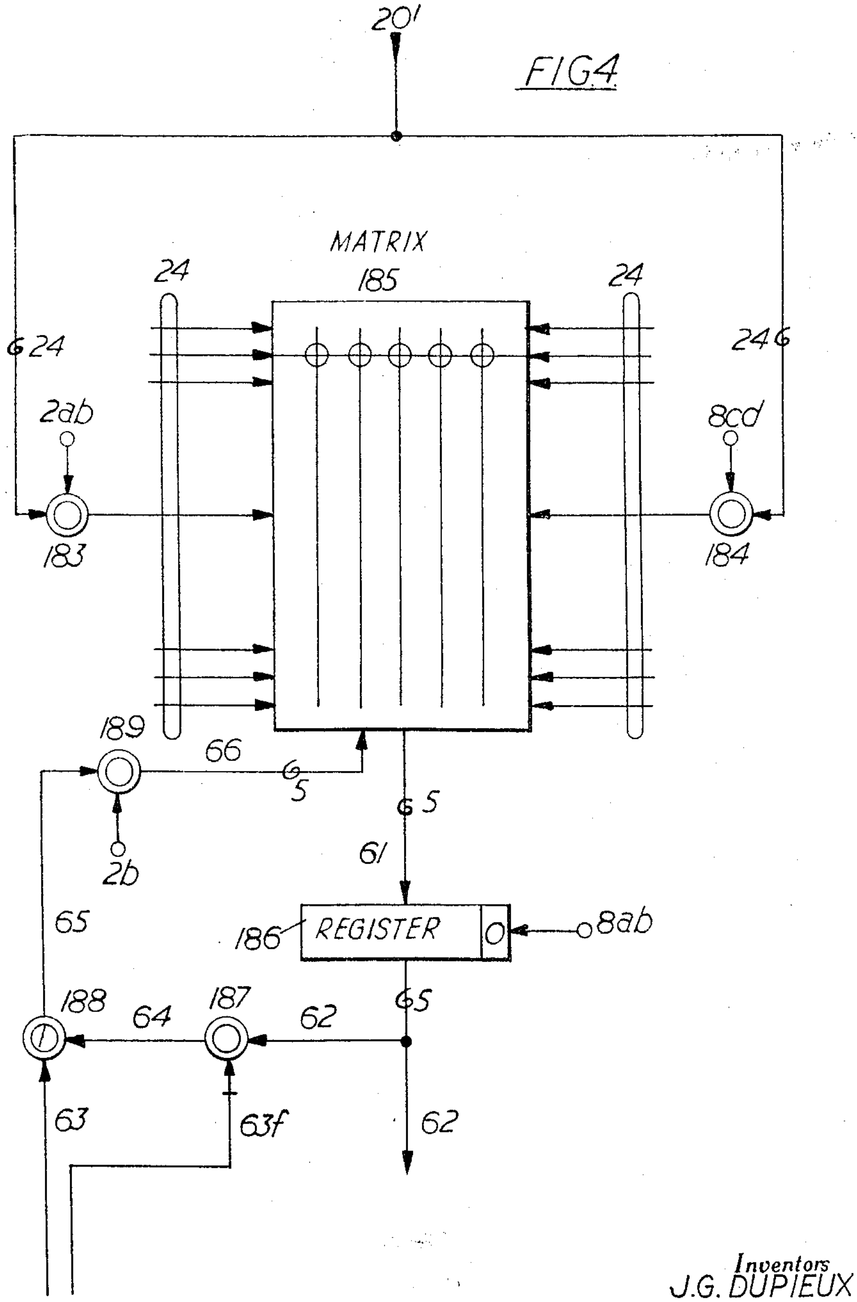
FIGURE 4 shows the diagram of the access elements to the path stores.

FIGURE 4 represents, by way of example, a diagram of the access circuits to a path store.

As it has been seen previously, the matrix 185 comprises $m-1$ lines (24 in the present example), and as many columns as it is necessary to store either channel codes or row trunk codes (for $m=25$, this code comprises $v=5$ digits in a nonredundant binary code). In the course of the description such codes will be designated under the general term of "number codes" as opposed to "zero codes."

The codes extracted from this matrix 185 are transmitted on the group of conductors 61 and are stored in the instruction register 186. This instruction which is available on the group of conductors 62, is used to select, during the channel time slot of the connection set-up, either an address in a data store or a cross-point in the switch. The instruction stored on the line 13 of the store must be available in the register 186 during the times $t13.1$ to $t13.7$ which are reserved for the bi-directional transfer of the 7 digits of a message between the incoming line and outgoing line data stores.

In order to fulfill this condition, the cyclic selection of the lines of the path stores is carried out by means of the shifted channel time slot signals $t'1$ to $t'24$. These signals are received over the group of 24 conductors 20' and are transmitted, in the case of a time path store, to the selection circuit of the matrix 185 by the activation, in 8*cd*, of the multiple AND circuit 184. As it has been seen previously, one has, if dealing with the line 13, $t'13.8cd=t12.8cd$ so that the transfer of the code in the register 186 is performed before the time where the transfer of data begins in the switching stage.

The register 186 has been previously reset to zero at the time 8*ab*.

By way of a non-limitative example it is assumed that the storage matrix used is of the type wherein a number code is destroyed when read and replaced by a "zero code."

It is thus necessary to provide for a re-writing device of the codes read in matrix 185 before resetting the instruction register 186 to zero.

In order to carry out the resetting, the group of output conductors 62 is connected to the group of conductors 65 assigned to the inscription of the codes in the matrix through the AND circuit 187 and the OR circuit 188.

When the code stored in the register 186, coming for instance from the line 13, must be re-written in the matrix without modifications, the AND circuit 187 is activated. The line 13 being selected in 2*ab* by the activation of the AND circuit 183, the code is transmitted in parallel form to the matrix column on the groups of conductors 62, 64, 65 and 66 by the activation in 2*b*, of the multiple AND circuit 189.

A code read in the line 13 at the time $t'13.8cd=t12.8cd$ is thus re-written in the same line at the time $t'13.2b=t13.2b$.

The modifications of the contents of a line store may be the replacement (1) Of a code number by the zero code;
(2) Of a code number by another code number;
(3) Of a zero code by a code number.

The AND circuit 187 is assigned to the control of this code modification operation. A "code modification" signal appearing on the inhibiting input 63*f* of this AND circuit during the considered channel time slot $t13$ characterizes this operation, and the code which is present on the group of conductors 62 cannot be re-written. If during this time slot, no signal appears on the inputs 63 of the multiple OR circuit 188, no code number is stored in the corresponding line of the matrix which thus contains the zero code.

If a number code is applied during this time to the group of conductors 63, it passes through the OR circuit 188 and is stored in the matrix 185.

The conductor 63*f* on which the code modification signal is transmitted is an additional conductor associated with the group of conductors 63 on which the new code to be registered is transmitted. The codes are always transmitted to the path stores through a multiple AND circuit placed in the order execution block 300 which is activated at the considered channel time slot and the signal which activates this AND circuit is used for the formation of the signal 63*f*.

The order execution block 300 which performs the operations controlled by the phase signals comprises the following elements:

(a) The group of instruction registers 310;
(b) The group data search circuits 350; and
(c) The group of switching stage access circuits 400.

The initial data are transmitted from the common control circuit 499 to the group of instruction registers 310 over the group of conductors 52P.

Since the switching stage comprises $n1$ row trunks connected to the $n1$ rows of the switch and $n2$ column trunks connected to the $n2$ columns of the switch, the block 400 allows for the selective access to the path stores of the different trunks, the choice being determined by the signals delivered by a certain number of decoders. These signals are obtained by the interpretation, in the decoders, of row and of column trunk codes received from the block 310. The selection of a row trunk may also be obtained by the interpretation of a code supplied, over the group of conductors 40, by the group of ancillary circuits 250, advancing of said code being cyclic.

The data search and code modification operations entail exchanges of codes between the circuits 99, 400, 350 and 310. These are carried out on the groups of conductors 58P, 54P and 59P from the switching stage towards the block 310 and on the groups of conductors 53M and 58M in the opposite direction.

All the operations concerning a data search are performed in the block 350. The codes transmitted cyclically from the switching stage are either selected therein at a marked channel time slot, or compared with some of the codes registered in the block 310, or compared with to channel time slot codes which are used in this case, as channel codes.

The results obtained are, as it has been seen during the discussion of the second type operation, either one or several channel codes and/or trunk codes, which are stored in registers in the block 310; a code modification channel time slot $tC$ or $tD$ which is marked; or, some particular signals which are stored in the unit storage elements provided for thereon.

A signal 13F characterizing the execution of a data search order is sent to the common control circuit 499 which is thus informed that the results of the operation are available. The common control circuit may control, by means of an order transmitted on the conductor 11H, the transfer of the results in its own registers. This transfer concerns the codes stored in the registers of the block 310 and the marked channel time slot codes *t*D and *t*C.

The circuits controlling the performance of the code modification operations in the path stores are placed in the access circuits 400. For these operations, use is made of the trunk and channel codes which are related to the connection and which are received from the circuit 499. Use is also made of the marked channel time slot signals *t*D or *t*C which are obtained from their codes received on the group of conductors 27. These codes and these signals can also be available in the blocks 310 and 350 at the end of a data search operation. They can then be used directly for a data modification operation following immediately said data search operation in which case the execution signal 13F relative to the data search operation is not followed by a transfer signal 11H.

The signals 20 and 30 mentioned during the description of FIGURE 3 are delivered by the exchange clock 600 which comprises a high stability generator controlling the advancing of three counters. These counters show respectively the codes of the basic time slots *a*, *b*, *c* and *d*, of the digit time slots 1 to 8 and of the channel time slots *t*1 to *t*25. These codes are interpreted by means of decoders associated to the counters and 4 signals *a*, *b*, *c*, *d*, are available on 4 conductors, 8 digit time slot signals are available on 8 conductors, and 25 channel time slot signals are available on 25 conductors. All these conductors carry the common reference 20.

The exchange clock supplies also, on the group of conductors 20', the shifted channel time slot signals *t'*1 to *t'*25. These signals are applied to the switching stage 99.

On the other hand, the channel time slot code *t*1 to *t*25 are transmitted on the group of conductors 30.

Before undertaking the detailed description of the circuits constituting the marker stage 199, the different signals 13 elaborated by the phase signals generator in response to the orders A, B, C, D and E, will be studied.

Each one of these phase signals controls, with the exception of the last one of each order, a selection operation and either a data search operation or a code modification operation. The last phase enables the elaboration of the execution signal.

The order A which controls the setting-up of a connection when the 4 trunk and channel codes and the channel time slot *t*C at which this connection may be set up are known, comprises two phases AI and AII.

The phase AI comprises a selection of path stores and the inscription of the 4 codes defining the new connection on the lines C of said stores and the phase AII is that of elaboration of the execution signal F the use of which will be discussed further on.

The order B, which controls the breaking of a connection when the two trunk codes as well as the marked channel time slot *t*D are known, comprises 2 phases BI and BII.

The phase BI comprises a selection of path stores and the inscription of the zero code in the lines D of said path stores. The phase BII is the phase of elaboration of the execution signal F.

The order C which controls the free channel search operation in a given trunk comprises two phases CI and CII. The phase CI comprises a selection of path stores and a data search in the time path store of the considered trunk. The result is either the code of a free channel and a "free channel" information referenced VL, or a "busy" information referenced OCI if no channel at all is free. Two independent storage elements enable to store that information which has been shown up. The phase CII is the phase of elaboration of the execution signal F.

The order D controls a path identification operation and comprises 4 phases. This operation consists in finding, while knowing a trunk code and a channel code in this trunk, the trunk and the channel with which it is connected as well as the channel time slot *t*D of the connection. The performance of the operation is different according to whether row codes or column codes are searched for.

The circuit 210 (FIGURE 3) elaborates in the first case an order DR and in the second case an order DC.

The phase DCI and the phase DRI comprise a selection of the one or several path stores of the trunk, whose code is known and a search of data in the time path store, in order to mark the channel time slot *t*D of the connection. This channel time slot is shown up under the form of a time signal.

The phase DCII comprises a selection of the space path store of the trunk, the code of which is known (the code JR of row trunk) and a data search in said store which consists in the selection of the trunk code received at the marked channel time slot *t*D. This code is the result of the operation i.e. the code JC of the column trunk connected with JR and it is stored in the block 310.

The phase DRII comprises successive selections of the path stores of the row trunks associated to the exchange which enables to carry out a succession of data search operations in the space path stores. This cyclic operation proceeds up to the time when a column trunk code read in *t*D in one of these stores is identical to the known code JC. The result is then the code JR of the row trunk whose space path store was selected at this time. This code is registered in the block 310. As for DCII this operation consists in the selection of a trunk code at the marked channel time slot *t*D.

The phases DCIII and DRIII comprise a selection of the path stores of the trunk the code of which has been found during the phase II. This selection is used for a data search in the time path store of said trunk which consists in the selection of a channel code at the marked channel time slot *t*D. The result is a channel code which is stored in the block 310.

The phases DCIV anrd DRIV are used for the elaboration of the execution signal F.

The order E controls the search of a common free channel time slot *t*C on the two trunks to be connected and comprises three phases. The phase EI is a waiting phase which does not comprise the performance of any operation. The phase EII comprises a selection of path stores and the performance of a data search which consists in investigating for the channel time slot *t*C and in marking it. If no free channel time slot at all is found, a condition OC2 is stored in a particular storage cell. The phase EIII is the phase of elaboration of the execution signal F.

As it has been stated previously, the signal F is transmitted to the circuit 499 (FIGURE 3) on the conductor 13F, in order to indicate that the operation in course is ended, and that the results are available in the registers of the blocks 310 and 350.

Figure 5:
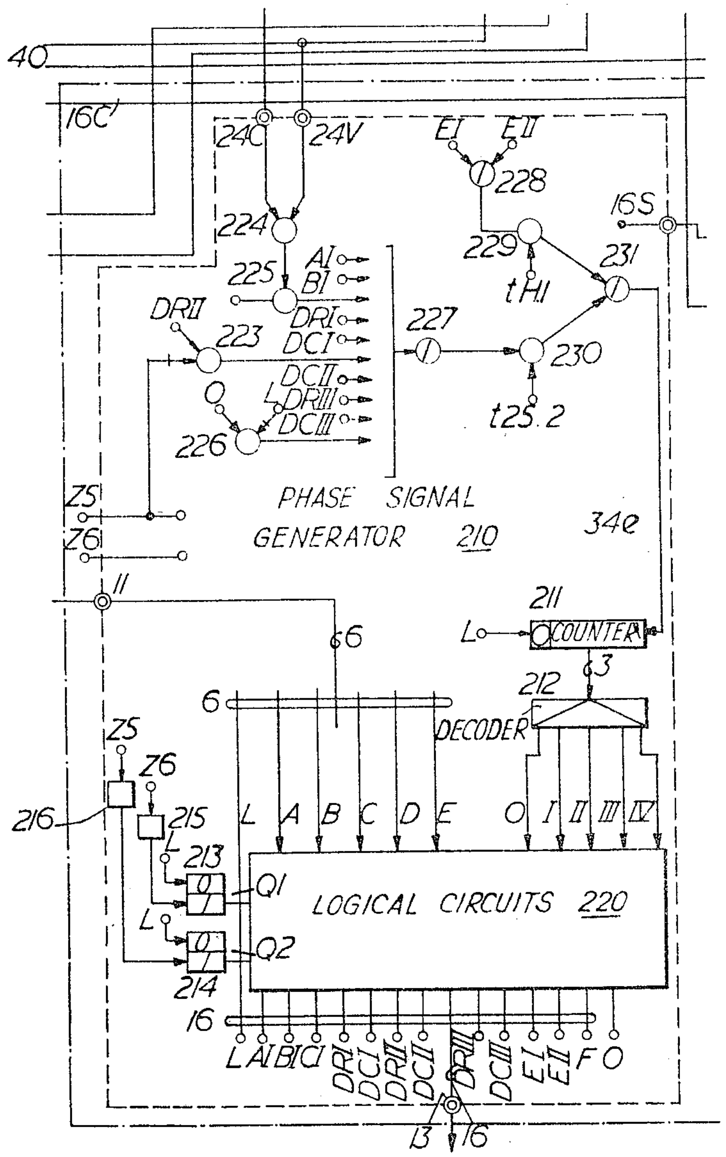
FIGURE 5 shows the detailed diagram of the phase signals generator.
Figure 6:
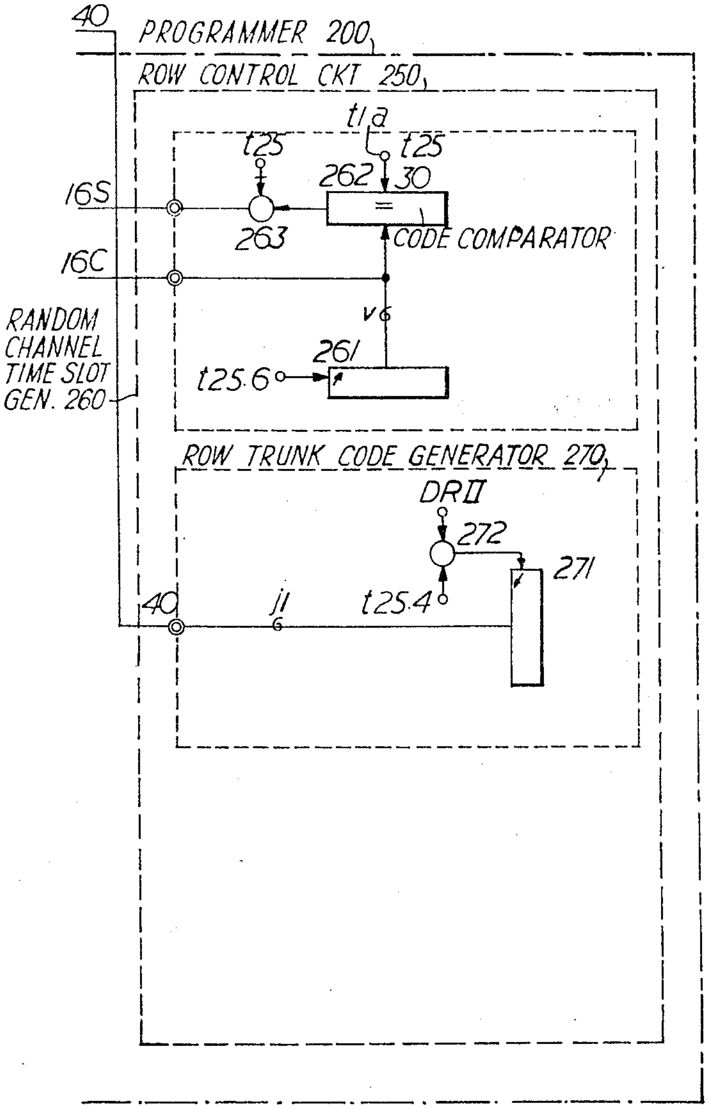
FIGURE 6 shows the detailed diagram of the group of the ancillary circuits.

FIGURES 5 and 6 represent the detailed diagram of the phase signals generator 210 and of the group of ancillary circuits, the combination of both circuits constituting the programming block 200.

The phase signals generator 210 shown on FIGURE 5 and which receives the group of the 6 conductors 11, the elementary orders A, B, C, D, E and L transmitted by the common control circuit 499, will be first described. The conductors assigned to the orders A, B, C, D and E are connected to 5 inputs of the logical block 220.

On the other hand, the selector constituted by the counter 211 reset to zero by an order L and by the decoder 212, determines the phase signals 0, I, II, III and IV.

The signals delivered by this decoder 212, with the exception of the signal 0, are also applied to the logical block 220 which receives besides signals delivered by two flip-flops 213 and 214.

If Q1 and Q2 designate the logical condition characterizing the fact that these flip-flops are in the 1 state the logical conditions characterizing the fact that two of the registers of the block 310, FIGURE 3, are empty (the registers involved will be designated further on) one may write:

$Q1=\overline{Z6}$ and $Q2=\overline{Z5}$ (inverters 215 and 216)

These conditions are present up to the time when an order L is received which resets the flip-flops to the 0 state and one has the conditions Q1 and Q2.

The circuits placed in the logical block enable to obtaining the following signals on the outputs:

| | |
|---|---|
| $A \times I=AI$ | |
| $B \times I=BI$ | $C \times I=CI$ |
| $D \times I \times Q1=DCI$ | $D \times I \times Q2=DRI$ |
| $D \times II \times Q1=DCII$ | $D \times II \times Q2=DRII$ |
| $E \times I=EI$ | $E \times II=EII$ |
| $D \times III \times Q1=DCIII$ | $D \times III \times Q2=DRIII$ |

$$A \times II+B \times II+C \times II+D \times IV=F \quad (1)$$

The advance signals for the counter 211 are applied on its input 34*e* and are supplied by the logical circuits 221 to 231. These signals will be referenced *e*, each signal *e* forcing the counter to advance by one position.

Their elaboration conditions will only be described and the reasons of the selection of the times will be explicited during the general description of the operation of the order execution block 300.

Before sending to the time control circuit 210 and operation order, the common control circuit 499 transmits to it an order L which resets the counter 20 in the position 0. The order L is cancelled only when an operation order is received: one is then in the condition $0 \times \overline{L}$.

This condition energizes the AND circuit 226 which sends a signal *e* to the counter 211 at the time *t*25.2 (logical circuits 227, 230, 231). It is thus seen that the phase signals AI, BI, CI, DCI, DRI and EI are set up for the condition $0 \times \overline{L} \times t25.2$.

The advancing of the counter 211 for the other phases of each one of the operation orders will be described now.

When the signal AI is present, one has $AI \times t25.2=e$ (logical circuits 227, 230, 231), the counter 211 advances to the position II and, according to the Equation 1, the logical block 220 delivers a signal F.

When the signal CI is present one has, if VL and OCI designate signals applied on the inputs 24V and 24C:

$(VL+OCI) \times t25.2=e$ (logical circuits 224, 225, 227, 230, 231), and the counter 211 advances to the position II and the block 220 delivers a signal F.

When the common control circuit delivers the order D it has been seen, that when the counter was in position I, the block 220 delivered a signal DCI or DRI according to which of the conditions Q1 or Q2 was present. One has afterwards $(DCI+DRI) \times t25.2=e$. The counter advances to the position II and the block 220 delivers one of the signals DCII or DRII according to which of the conditions Q1 or Q2 is present. One has afterwards:

$DCII+DRII) \times \overline{Z6} \times t25.2=e$ (through the logical circuits 223, 227, 230, 231), the counter 211 advances to the position III and the block 220 delivers a signal on one its outputs DCIII or DRIII according to which of the conditions Q1 or Q2 is present. One has afterwards $(DCIII+DRIII) \times t25.2=e$ (through the logical circuits 227, 230, 231). The counter 211 advances to the position IV and, according to Equation 1, the block 220 delivers a signal F.

Last, when the signal EI is set up, one has $EI \times tH.1=e$ (through the logical circuits 228, 229, 231 (FIGURE 5)) and the block 220 delivers a signal on its output EII. One has afterwards $EII \times tH.1=e$ (through the same logical circuits as previously) and the block 220 delivers a signal on its output F. (The signal *t*H is a signal elaborated in the group of ancillary circuits 250.)

It will be assumed that the counter 211, the decoder 212, and the logical block 220 operate sufficiently fast so that a phase signal starts at the latest, one digit time slot after the time of activation of one of the AND circuits 222, 229, 230.

FIGURE 6 represents the detailed diagram of the generator of random channel time slot signals 260 and of the generator of row trunk codes 270 which constitute the group of ancillary circuits 250.

The circuit 260 comprises the 25 position counter 261 which advances by one position at each digit time slot *t*25.6 by showing out a succession of codes identical to the succession of the channel time slot codes elaborated by the clock 600 and the comparator 262 which compares the code shown out in this counter with the channel time slot codes elaborated by the clock 600, on the group of conductors 30. An AND circuit 263, inhibited in *t*25, impedes the appearance of a random time signal *t*H during this channel time slot.

Since the counter 261 advances by one position at each frame period, the signal *t*H delivered by the comparator on the conductor 16S occupies successively all the channel time slots. Thus, if the counter is in the position *t*1, at the first frame period, the coincidence with the codes received from the clock, occurs in *t*1 and one has $tH=t1$, this signal *t*H having a duration of one channel time slot. At the second frame period one has $tH=t2$, at the third $tH=t3$, etc.

The codes *t*H are available on the conductor 16C.

The circuit 270 comprises a counter 271 which advances by one position at each signal delivered by the AND circuit 272. This latter is activated for the logical condition $DRII \times t25.4$. The counter 271 shows out successively the row trunk codes (it comprises thus *n*1 positions) which are transmitted on the group of conductors 40 to the block 350 so that, at each frame period of the phase DRII, a different row trunk is selected for a data search.

The operations which are carried out in the marker stage are controlled by orders elaborated in the common control circuit 499 (FIGURES 3 and 10), in accordance with informations received, first from circuits not described in this text (call detectors, call registers, etc.) or associated circuits, and second, from the marker stage itself.

The FIGURES 2, 7, 8, 9 and 10 show the whole assembly of the connection control circuits and of the switching stage.

FIGURE 2 comprises from top to bottom:

The switching stage 99, whereupon are shown the circuits related to a given connection, and which has been described previously.

The switching stage selection circuit 480 belonging to the marker stage.

Figure 7:
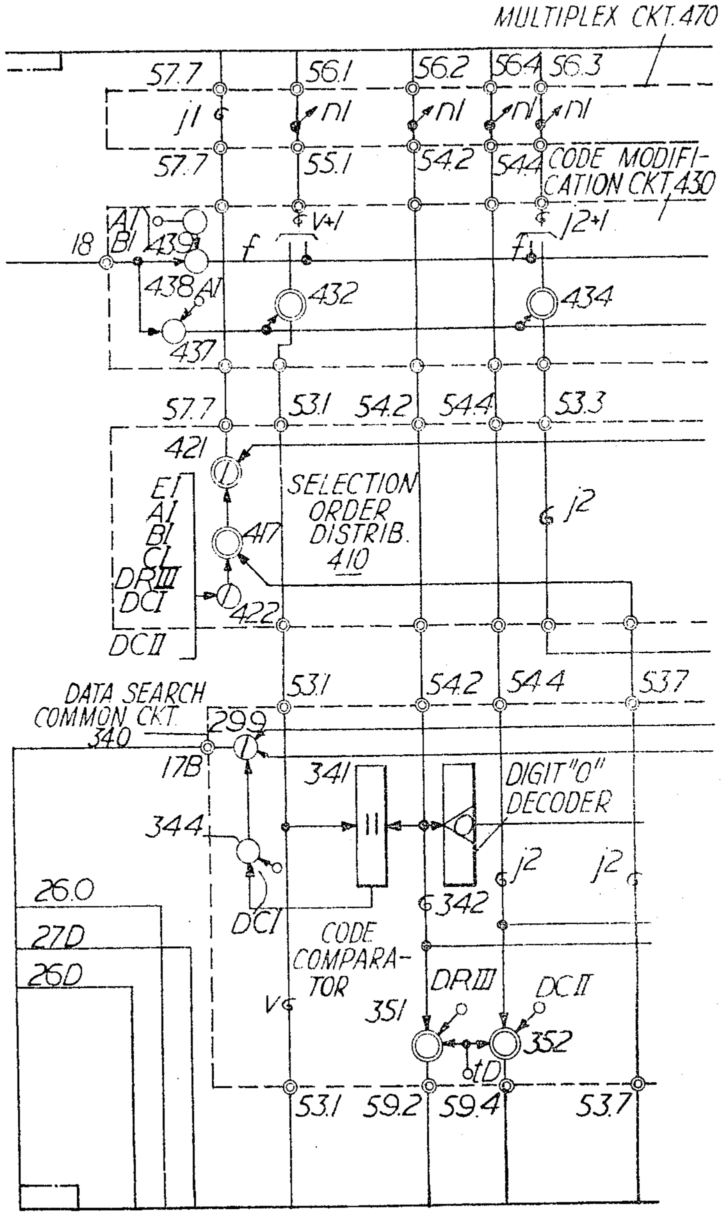
FIGURE 7 shows a multiplexing circuit, a code modification circuit, a selection order distributor, and a data search common circuit.
Figure 7A:
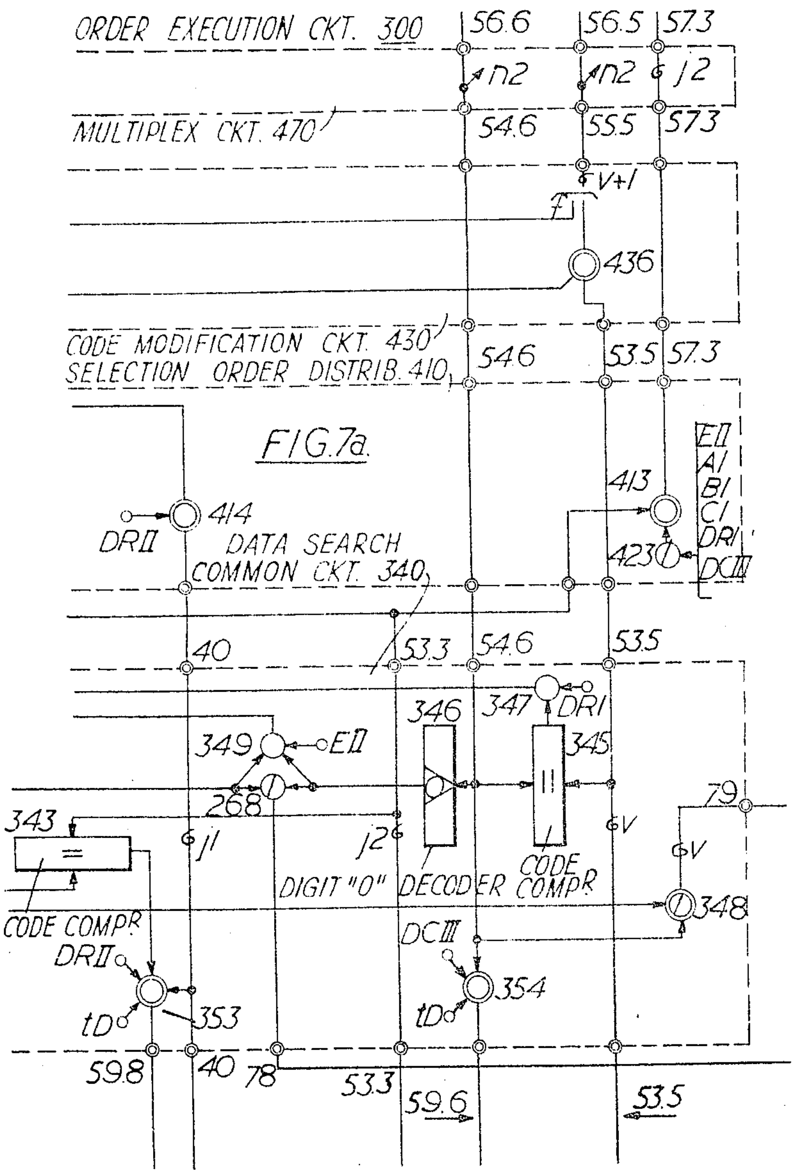

The FIGURE 7 which matches and completes the preceding one comprises from top to bottom:

The multiplex circuit 470.

The code modification circuit 430 and the selection order distributor 410.

The whole assembly of the circuits 480, 470, 430 and 410 constitutes the group of the switching stage access circuits 400 to the path stores.

The group of data search common circuits 340. All these circuits belong to the marker stage.

Figure 8:
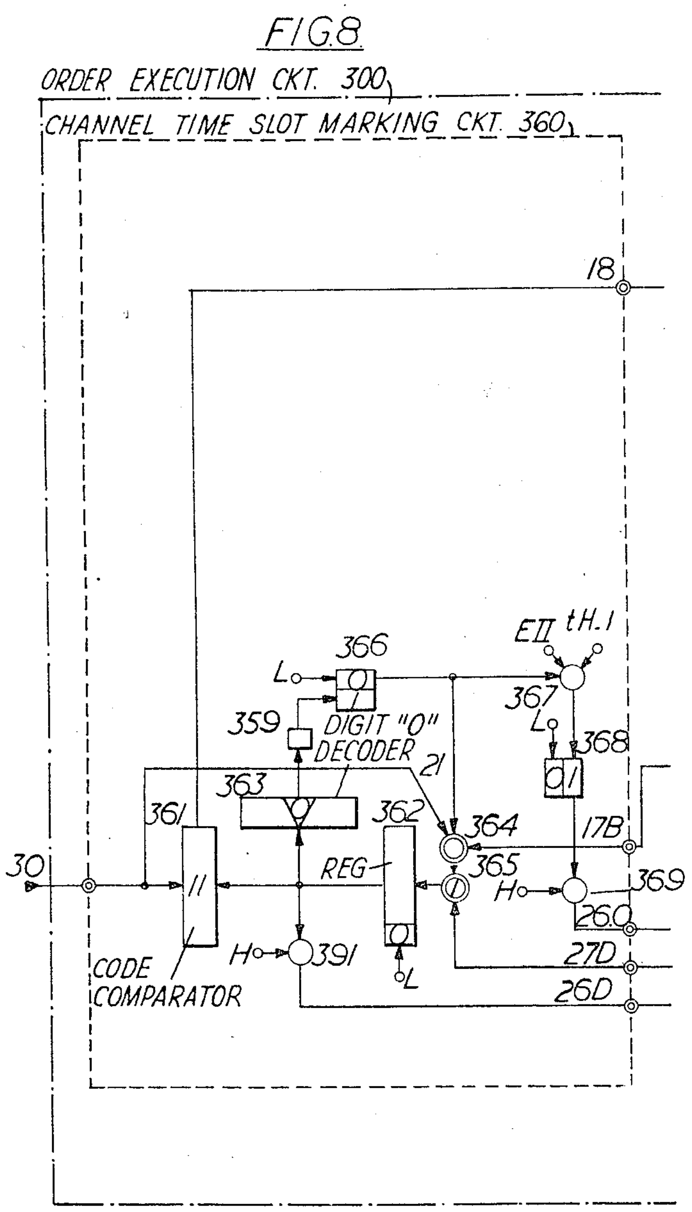
FIGURE 8 shows the detailed diagram of the channel time slot marking circuit.
Figure 9:
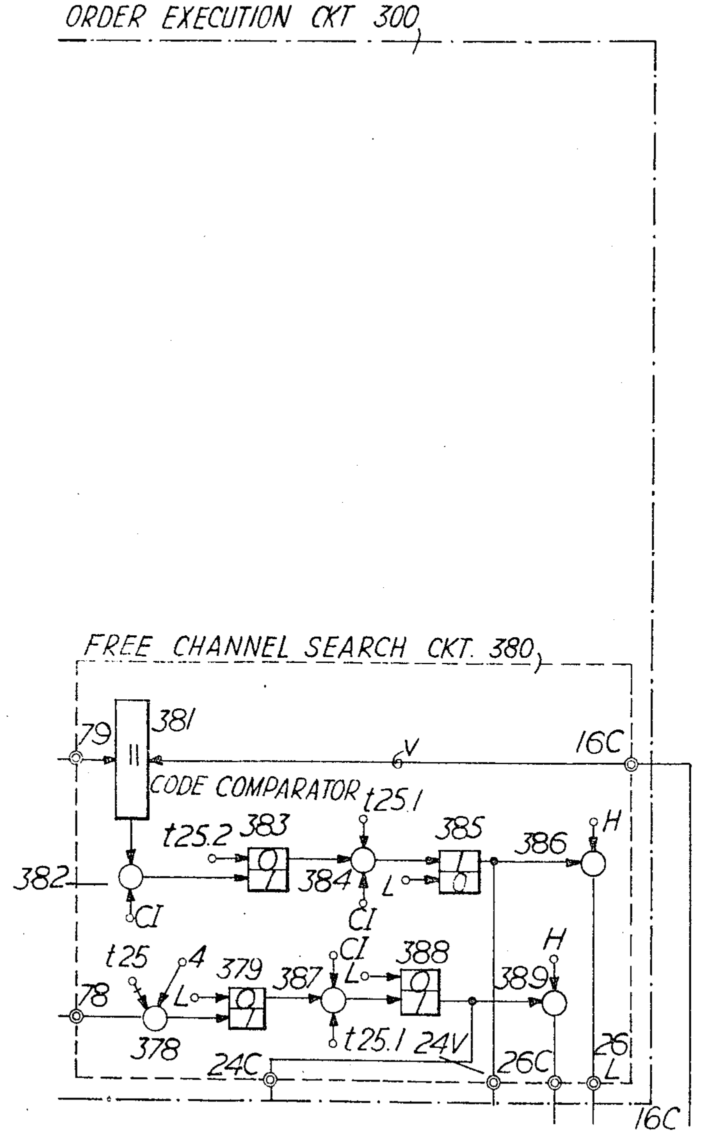
FIGURE 9 shows the detailed diagram of the free channel search circuit.

The FIGURES 8 and 9 represent respectively:

The channel time slot marking circuit 360 and the free channel search circuit 380. These circuits also belong to the marker stage.

The whole assembly of the circuits 340, 360 and 380 constitutes the group 350 of data search circuits.

Figure 10:
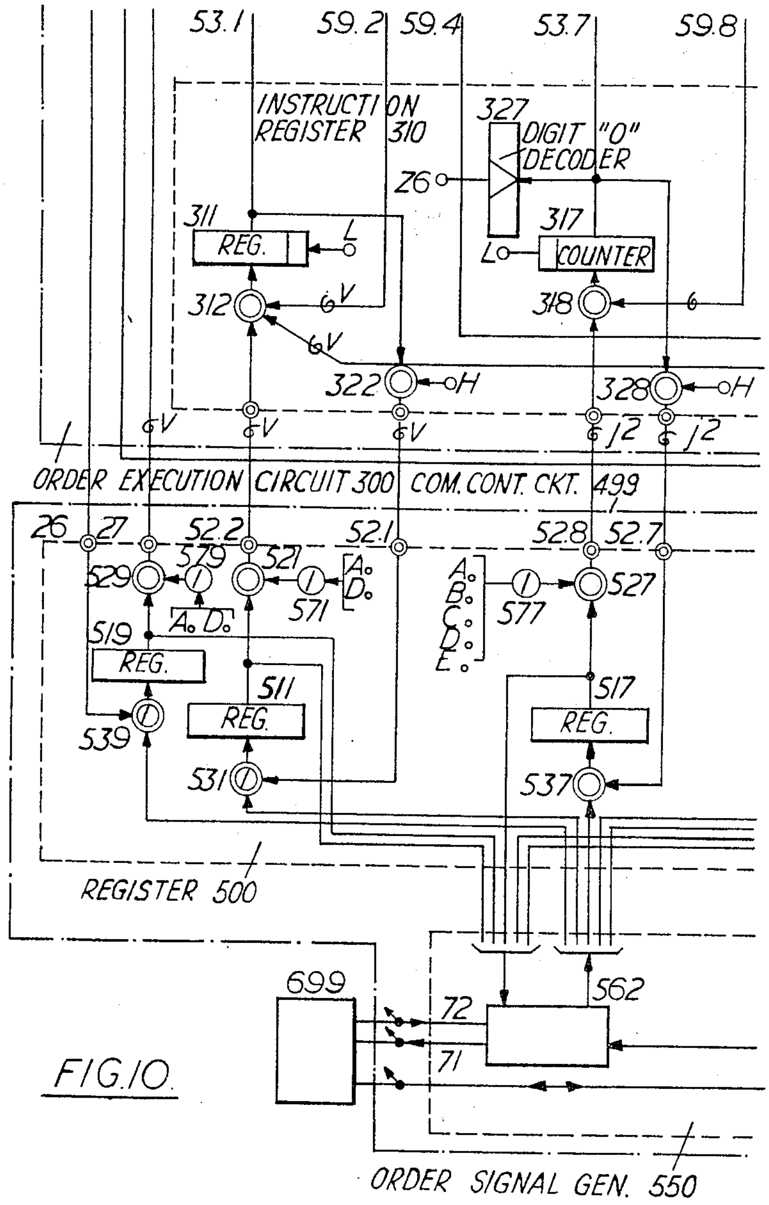
FIGURE 10 shows a group of instruction registers of the marking stage, a block of the registers of the common control circuit and a generator of orders signals.
Figure 10A:
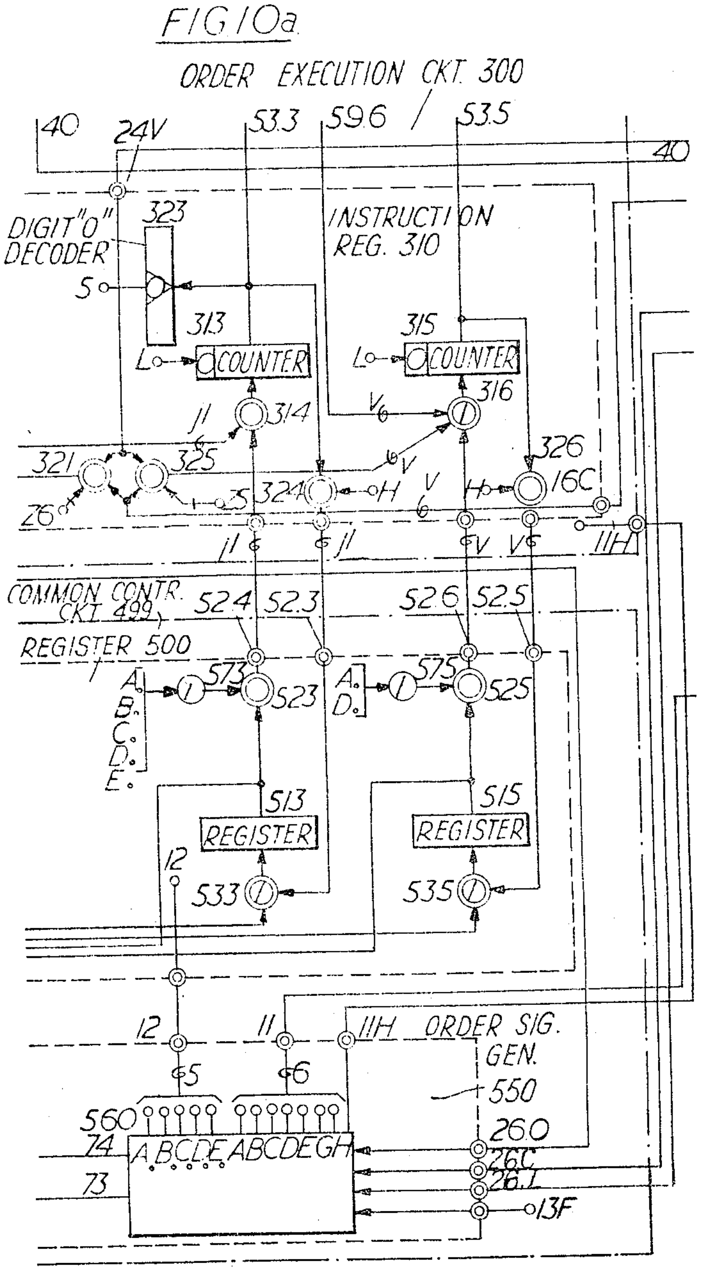

FIGURE 10 comprises from top to bottom:

The group of instruction registers 310 belonging to the marker stage.

A part of the circuits constituting the common control circuit 499, i.e. the block of the registers 500 and the generator of order signals 550.

Figure 11:
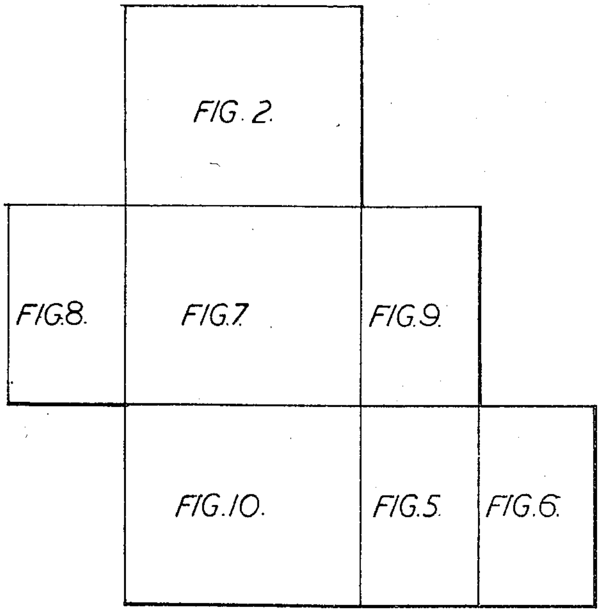
FIGURE 11 shows the way in which the sheets of drawings comprising FIGS. 2, 5, 6, 7, 8, 9 and 10 should be arranged in order to be best understood.

FIGURE 11 represents the assembly diagram of the FIGURES 2, 5, 6, 7, 8, 9 and 10.

The blocks 210 (FIGURE 5) and 250 (FIGURE 6) constitute the programming block 200, the circuits 310, 340, 360, 380, 410, 430, 470 and 480 constitute the order execution block 300 and the marker block 199 is constituted by the grouping of these blocks 200 and 300.

In the FIGURES 2, 7 and 10 the circuits for the transfer of the codes between, first, the block 310 (FIGURE 10) and the switching stage 99 (FIGURE 2) and, second, the block 310 and the common control circuit 499 have been grouped. This transfer may be carried out in the two directions.

Figure 12:
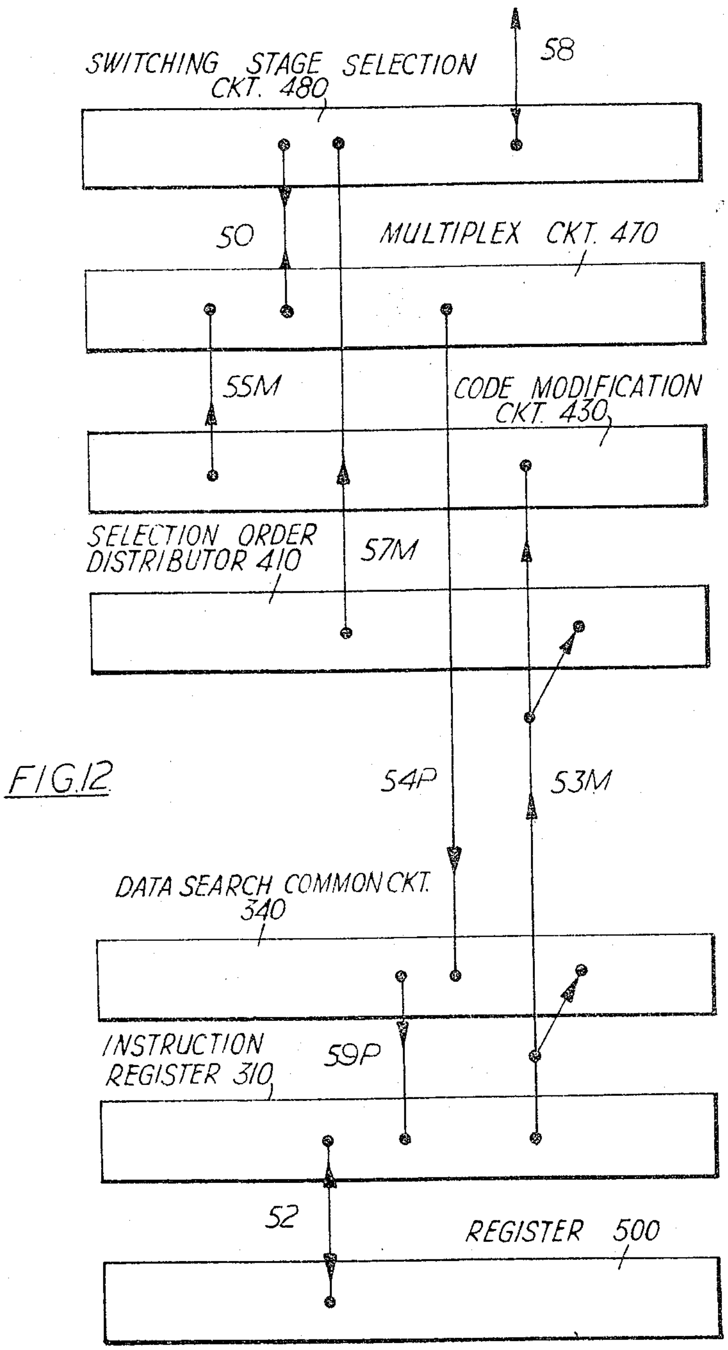
FIGURE 12 shows a diagrammatic view of the interconnectors between FIGS. 2, 7 and 10.

FIGURE 12 represents a diagrammatic view of the circuits of the FIGURES 7 and 10 on which the reference numbers assigned to the group of conductors connecting the different block and circuits have been shown symbolically.

In the block 310, the registers 311, 317, 313 315 are respectively assigned to the storage of the codes VR, JR, JC, VC and are reset to zero by an order L.

The channel of elaboration of the orders in the common control circuit 499 (FIGURE 10) will be described now.

The registers 511, 513, 515, 517 and 519 of the circuit 499 are used for storing information coming from an associated circuit and they are used in particular for registering the information destined to the marker stage as well as the results received from said marker when it has completed one operation. The associated circuits such as the call registers used for receiving, from the calling subscriber, the number of the called subscriber or the sender-receiver circuits used for exchanging informations with other switching stages located, for instance, in other exchange offices, have been shown diagrammatically in 699. These associated circuits may transmit or receive, for instance from the circuit 550, data (over the groups of conductors 71 and 72) or service informations (through the group of conductors 73). It will be assumed, by channel of example, that the transfer of data between the associated circuits and the registers 511, 513, 515, 517 and 519 is carried out by means of a switching circuit, shown diagrammatically in 562, such a circuit being controlled by the logical block 560 (through the group of conductors 74 which exchanges with the auxiliary circuits service information, over the group of conductors 73. The marker circuit is treated by the common control circuit, from the point of view of data transfer and service information transfer, in the same channel as an associated circuit. However, in order to make more explicit the explanation of the following operations carried out by the marker circuit and controlled by the common control circuit in simple cases of telephone exploitation, one has shown: first, the AND circuits 521, 523, 528, 527 and 529, which enable the selective control of data transfer towards the marker (as well as the multiple OR circuits 571, 573, 575, 577 and 579 which are associated to them) and second, the OR circuits 531, 533, 535, 537 and 539 which give access to the data registers for registering therein. These OR circuits would be normally included in the switching circuit 562. It is understood that the present invention concerns one switching stage and its associated control circuits and that the description of the common control circuit 499 is given by channel of example of application to telephone switching. As it has been seen previously, the marker stage performs an operation when it receives from the common control circuit the initial data (on the group of conductors 52P) and the corresponding order signal (on the group of conductors 11) and, when this operation is completed, it indicates to the common control circuit the end of the operation (through the conductor 13F), the nature of the result under the form of a service information (through the conductors 26–0, 26–C and 26–L and puts at its disposal the obtained data. The common control circuit may thus control, the transfer of the results in its registers by sending to the marker stage an order H on one of the conductors. This order controls the AND circuits 386 and 389 (FIGURE 9) and 322, 328, 324 and 326 (FIGURE 10). One understands that these AND circuits might have been located in the common control circuit, in which case they would have belonged to the switching circuit 562.

It has been seen, during the study of the phase signals generator 210 (FIGURE 5) that the setting-up of the phase I of an order A, B, C, D or E was controlled, in *t*25.2, by the activation of the AND circuit 230. It will be assumed that the block 560 (FIGURE 10) transmits the order in *t*25.3 on the group of conductors 11 and that a signal 12, designated by the same reference affected with the index "*o*" (A*o* in the case of the order A, etc.), is associated to it from *t*25.3 to *t*25.6, i.e. before the setting-up of the phase I. This signal controls the data transfer between the common control circuit and the marker stage, before the setting-up of the phase I. This signal controls the data transfer between the common control circuit and the marker stage, i.e. it controls selectively the AND circuits 521, 523, 525, 527 and 529 (through the associated OR circuits 571, 575, 577 and 579).

As it will appear from the reading of the description the registers 311 and 317 (FIGURE 10) of the marker stage and the homologous registers 511 and 517 of the common control circuit are assigned to the row trunks and the registers 313 and 315 on the one hand, and 513 and 515 on the other hand, are assigned to the column trunks. It will be assumed that the row trunk codes and the column trunk codes are characterized respectively by the value of one or several digits of the code and that the common control circuit can recognize them. The information thus obtained is used, during the reception of a code from an associated circuit, for switching, by means of the circuit 562 (FIGURE 10), the data towards the registers which are assigned to them. It is understood that the information thus elaborated in the common control circuit is identical to that elaborated in the marker circuit by the code zero decoders 327 and 323 (FIGURE 10) i.e. to the signals Z6 and Z5. Identical signals are thus available in the common control circuit and, according to an alternative solution, they may be transmitted to the marker circuit at the same time as the orders A, B, C, D or E. However, the setting into operation of such an alternative solution would bring no modification at all to the operation of the marker circuit.

The circuits constituting the order execution block 300 (FIGURE 10) will be studied now, together with the channel according to which the operations controlled by the phase signals are performed therein. Thus, the following circuits will be studied successively:

The switching stage access circuits,

The circuits performing the operations related to the data modifications,

The circuits performing the operations related to the data searches.

As it has been seen previously, the group of the switching stage access circuits comprises the selection order distributor 410 (FIGURE 7), switching stage selection circuit 480 (FIGURE 2), the code modification circuit 430 and the multiplexing circuit 470 (FIGURE 7).

In the switching stage 99 (FIGURE 2), each one of the row trunks comprises a time path store and a space path store and each one of the column trunk comprises a time path store. Each one of these path stores may receive codes from the marker stage over a group of conductors 58–1, 58–3, 58–5 and may send codes over a group of conductors 58–2, 58–4, 58–6.

Since the marker stage operates with only one trunk of each type at a given digit time slot, the groups of access conductors to the stores coming from the circuits 430, 340 and 310 are multiplexed in the multiplexing circuit 470.

On each one of the *n*1 groups of conductors 56–1, 56–2, 56–3 and 56–4 a multiple AND circuit has been inserted in the selection circuit 480. The four multiple AND circuits related to each one of the trunks are activated simultaneously by the applicaiton, on a common input, of a signal delivered by a row trunk decoder 487. Only one of these groups of AND circuits, which are referenced 481 to 484, has been shown on the figure.

Similarly, one has inserted on each one of the *n*2 groups of conductors 56–5 and 56–6, multiple AND circuits 485 and 486 which are placed in the circuit 480, these multiple AND circuits being activated by the application of a signal delivered by a column trunk decoder 488.

It has been seen, during the description of the FIGURE 3, that the first type of operation performed under the control of a phase signal consisted in all cases (except during the phase EI) in a selection of one or several path stores which involves the selection order distribution 410 (FIGURE 7) and the selection circuit 480. The codes used are either one or both of the following codes: row trunk code stored in the register 317 (FIGURE 10), column trunk code stored in the register 313. These two registers are placed in the block 310 and are reset to zero by an order L.

These codes are transmitted to the circuit 410 (FIGURE 7) respectively on the conductors 53–7 and 53–3. The circuit 410 comprises two multiple AND circuits 417 and 413 placed respectively on the conductors 53–7 and 53–3 so that the codes are transmitted to the circuit 480 on the groups of conductors 57–7 and 57–3 only when suitable phase signals are applied on the activation input of the AND circuits 417 and 413. It comprises also a multiple OR circuit 421 inserted on the conductor 53–7, which enables the sending, to the circuit 480, of a row trunk code present on the group of conductors 40, this code being different from that stored on the register 317. The codes transmitted on the groups of conductors 57–7 and 57–3 are applied respectively to the decoders 487 and 488 (FIGURE 2) which comprise, the first one *n*1 outputs connected to the *n*1 groups of 4 multiple AND circuits 481 to 484 and the second one *n*2 outputs connected to the *n*2 groups of 2 multiple AND circuits 485 and 486.

The AND circuits 417 and 413 (FIGURE 7) of the selection order distributor 410 receive their activation signals respectively from the multiple OR circuits 422 and 423.

The processing of the selection operations has been described at the end of the study of FIGURE 3. Thus, the two decoders 487 and 488 are respectively connected to the registers 317 and 313 during the phases EII, AI, BI and CI.

It will be noticed that the two AND circuits which give access to the decoders are simultaneously activated during a phase CI but it has been seen previously that only the code of the trunk on which a free channel search must be carried out is recorded in the corresponding register.

For a path identification operation, the AND circuit 417 is activated during the phases DCI and DCII which are set up when the channel and row trunk codes are known. It is also energized during the phase DRIII (when the known codes are the channel and column trunk codes) since at the end of the previous phase DRII, the row trunk code has been stored in the corresponding register 317.

The AND circuit 413 is activated for the phase DRI as well as for the phase DCIII since, at the end of the previous phase DCII, the column trunk code has been stored in the corresponding register 313.

Last, the AND circuit 414 is activated during the phase DRII so that the succession of codes transmitted on the conductor 40 enables to select successively all the row trunks, each one of the trunks being selected for a frame period duration.

The code modification circuit 430 (FIGURE 7) wherein the operations related to the code modifications are performed will be described now. It has been seen that, in this case, the trunk path stores whose codes are recorded in the registers 313 and 317 (FIGURE 10) are simultaneously selected.

This selection is carried out, first, in the course of the phase AI of setting up of a connection during which the modification of the codes consists in transferring the codes VR, JC, VC placed respectively in the registers 311, 313, 315 on the lines C of the selected path stores and on second, during the phase BI of breaking of the connection during which the modification consists in writing the code zero on the lines D of the selected path stores.

One each one of the groups of conductors 53.1, 53.3 and 53.5 which come from the block 310 (FIGURE 10) a multiple AND circuit has been inserted followed by a multiple OR circuit referenced 432, 431 (on the conductors 53.1); 434, 433 (on the conductors 53.3); 436, 435 (on the conductors 53.5). The code modification channel time slots are *t*C for the phase AI and *t*D for the phase BI. The corresponding signals are marked by the channel time slot marking circuit 360 which will be described further on and are available on the conductor 18. The logical condition AI *x t*C is achieved by the AND circuit 437 which controls the activation of the multiple AND circuits 432, 434, 436. On the other hand, the AND circuit 438 activated in AI *x t*C and in BI *x t*D by the OR circuit 439 supplies, on its output conductor *f*, a code modification signal which is used in the control circuit of the path stores for blocking the re-writing as it has been explained in relation with the FIGURE 4. The groups of conductors 55.1 and 55.5 thus comprise each one $v+1$, i.e $v$ conductors for the transfer of the codes and one conductor for the transfer of the code modification signal, similarly the group of conductors 55.3 comprises $j1+1$ conductors. In order to simplify the representation, the conductor on which the signal *f* is transmitted is not particularized in the FIGURE 2, since the action of the signal *f* has been already explained in relation with the FIGURE 4.

The duration of the phases AI and BI is of one frame period.

The operations related to the data search are carried out by circuits placed in the group of data search circuits 350 which comprises the data search common circuits 340 (FIGURE 7), the channel time slot marking circuit 360 (FIGURE 8) and the free channel search circuit 380 (FIGURE 9).

A data search enables either to mark a given channel time slot or to select a channel or trunk code received from a path store at a marked channel time slot.

A channel time slot marking operation which will be represented by the symbol "M," may be carried out according to two different channels referenced M*a* and M*b*:

M*a*—The codes received from the selected time path store are compared to the code stored in one of the registers 311 or 315 of the block 310, and the channel time slot at which the two codes are identical is marked.

The identity is detected by one of the comparator 341 or 345 placed in the cricuit 340 and the marking is performed in the circuit 360 (FIGURE 8).

This type of operation is used during the phases DRI and DCI and the marked channel time slot is *t*D.

M*b*—The codes received from a row trunk time path store and a column trunk time path store are applied respectively to two zero code decoders 342 and 346 placed in the block 340 and the channel time slot at which the two decoders select simultaneously a zero code is marked, this operation being performed in the block 360.

This type of operation is used in the course of the phase EII and the marked channel time slot is *t*C.

The results of these two operations consist in the repetitive elaboration of a signal appearing on the conductor 18 during the marked channel time slot.

It will be noted that the code of the random channel time slot *t*H, the elaboration of which has been studied in relation with the description of the programming block (circuit 260, FIGURE 6), represents also a marked channel time slot but that, in this case, on deals with a channel time slot code, which advances by one position, at each frame period inside frame period.

A selection of channel or trunk code at a marked channel time slot which will be represented by the letter "K," can be carried out in three different channels, referenced K*a*, K*b* and K*c*.

K*a*—The code stored on the line corresponding to the marked channel time slot in a time path store or in a space path store is selected and stored in one of the registers of the block 310. This selection is controlled by the logical circuits 351, 352 and 354 placed in the block 340 (FIGURE 7).

This type of operation is performed during the phases DCII, DRIII and DCIII and the marked channel time slot *t*D is used.

K*b*—The space path stores of the row trunks being cyclically selected through the row trunk codes delivered on the group of conductors 40 by the circuit 270 (FIGURE 6), the received codes are compared to that one stored in the register 313. The comparison is made in the comparator 343 placed in the circuit 340 and the row trunk code giving the identity at the marked channel time slot is selected by the AND circuit 353 for storing in the register 317.

This type of operation is carried out during the phase DRII and the marked channel time slot *t*D is used.

K*c*—The codes extracted from a time path store are compared to the code *t*H in the circuit 380, until the time when there is no equality during a frame period. The code *t*H shown out during this frame period is selected and stored in one of the registers 311 or 315.

This type of operation is carried out during the phase CI.

The different operations of data search which are performed in the course of some phases of the orders C, E and D will now be described in detail.

A first data search operation consists in searching, during the phase CI, a free channel on the trunk, the code of which is shown out in one of the registers 313 or 317.

As it has been seen previously, the application of the phase signal CI to the circuit 410 enables to select this trunk, and it will be assumed, by channel of example that a row trunk is dealt with.

The code registered in the time path store of this trunk, are thus transmitted cyclically on the conductors 58–2, 56–2, 54–2 (58–6, 56–6, 54–6 in the case of a column trunk) and appear on the output 79 of the circuit 340 after passage in the multiple OR circuit 348.

On the other hand, these same codes are applied to the zero code decoder 342 (346 in the case of a column trunk) the output signal of which, referenced Z8, appears on the output 78 of the circuit 340 after passage in the OR circuit 268 (the second input of this circuit is connected to the output of the decoder 346).

These signals 78 and 79 are applied to the free channel search circuit 380 (FIGURE 9) and provoke, the first one, the elaboration of an occupation signal OC1 when none of the channels is free on the considered trunk, and the second one, the search of a free channel code and the elaboration of a signal VL as soon as a free channel code has been found.

The channel of elaboration of the signal OC1 will be first described. The circuit used comprises the AND circuits 378, 387 and 389 and the flip-flops 379 and 388. The AND circuit 378 comprises three inputs and it is conductive for the logical condition: $Z8 \ x \ \overline{t25} \ x \ 4$ (2) (in this expression the last number characterizes a digit time slot signal 4). The output of this AND circuit is connected to the input 1 of the flip-flop 379 which is reset to the 0 state by an order L. The first input of the AND circuit 387 is connected to the output 0 of this flip-flop 379, the second and third inputs receive signals C1 and *t*25.1 and its output is connected at the input 1 of the flip-flop 388 reset to the 0 state by an order L. Last, the output 1 of this flip-flop is connected to the AND circuit 389 which is activated by a signal H.

Equation 2 shows that the AND circuit 378 is activated at each digit time slot 4 of the channel time slots *t1* to *t24*. The first signal Z8 appearing during one of these time slots sets the flip-flop 379 in the 1 state.

It has been seen, during the study of the circuit 210 (FIGURE 5), that the signal CI set up in *t*25.2. Since the state of the flip-flop 379 is transmitted to the flip-flop 388 for the logical condition $C1 \ x \ t25.1$ (AND circuit 327), it is seen that this operation takes place only at the end of the first frame period of the phase CI.

If the flip-flop 379 is in the 0 state, i.e. if no signal Z8 at all has been received during this frame period, which means that there is no free channel at all on the trunk, the flip-flop 388 sets to the 1 state.

If the flip-flop 379 was in the 0 state, i.e., if at least one signal Z8 has been received during this frame period—which means that there is at least one free channel on the trunk—the flip-flop 388 remains in the 0 state.

The signal OCI delivered by the flip-flop 388 when it is in the 1 state at the end if the first frame period of the signal CI characterizes thus the fact that all the channels are busy on the trunk. This signal is transmitted to the circuit 210 (FIGURE 5) on the conductor 24C and controls the elaboration of the execution signal F.

The search for a free channel code which is an operation of the type K*c* will be now described.

The codes appearing on the input 79 of the circuit 380 (FIGURE 9) are applied to one of the inputs of the comparator 381 which receives the codes *t*H on its second input 16C.

It has been seen during the description of the circuit 250 (FIGURE 6) that the code *t*H advances by one position at each frame period so that it takes successively all the values *t1* to *t24* which represent, in the circuit 380, the different channel codes. At each frame period, the codes 79 extracted cyclically from the selected time path store are compared to the code *t*H present during this period. When the comparator 381 delivers a signal, this means that the channel *t*H is busy since its code is stored in the time path store.

The code *t*H shown out in a frame period during which the comparator has delivered no signal at all is then a free channel code.

The output signal of the comparator, after passage in the AND circuit 382 (FIGURE 9) activated in CI, is applied on the input 1 of the flip-flop 383.

The interval of a frame period is delimited by the signal *t*25.2 which resets this flip-flop to the 0 state and by an AND circuit 384 one of the inputs of which is connected to the 0 output of the flip-flop while the two others receive the signals CI and *t*25.1.

It will be assumed, by channel of example, that *t*H=*t*8.

At the time *t*25.2 of a previous frame period, the flip-flop 383 has been reset to the 0 state. Since the phase signal CI is set up only in *t*25.3, the AND circuit 384 becomes conductive only after a frame period.

The signal CI controls the selection of the considered trunk and, from the time *t1* which follows immediately, the channel codes are transmitted on the group of conductors 79. If in the course of this frame period (*t1* to *t24*) the code of the channel number 8 appears on the group of conductors 79, the flip-flop 383 sets to the 1 state and, at the following time *t*25.1, no signal at all appears at the output of the AND circuit 384.

On the contrary, if in the course of said frame period, the code of the channel has not appeared, the flip-flop 383 remains in the 0 state and, at the time *t*25.1 of this frame period, the circuit 384 is activated and a signal is applied on the 1 input of the flip-flop 385. At the time $t25.2$ the flip-flop 383 is reset to the 0 state. At the same time, the flip-flop 385 is in the 1 state, and this state, which is referenced VL, is transmitted on the conductor 24V, first, to the block 310 to control the inscription, in the corresponding channel register, of the channel time slot code $t$H, and second, to the block 210 for controlling the elaboration of the execution signal F.

The inscription is controlled by the multiple AND circuits 321 and 325 placed in the block 310 (FIGURE 10) which receive this signal 24V on one input and the code $t$H on a second input 16C.

It has been seen, during the study of the circuit 260 (FIGURE 6), that this code $t$H was modified in $t25.6$. Since the signal 24V is available at latest from the time $t25.2$ on, it is seen that, after $t25.6$, the code $t$H with which the comparison has been made is not modified.

This code is thus stored in the channel register 311 or 317 (FIGURE 10) according to whether the search was carried out in a row trunk or in a column trunk. This condition is shown up by the signals delivered by zero code decoders 327 and 323 placed in the block 310 which deliver respectively signals Z6 and Z5 when no code at all is stored in the associated register.

When a search is carried out in a row trunk, the register 317 contains the code of this trunk and the decoder 327 delivers a signal Z6 which activates the AND circuit 321 enabling the inscription of the free channel code $t$H in the register 311 when a signal 24V appears. In the same channel, during a search in a column trunk, the decoder 323 delivers a signal Z5 which activates the AND circuit 325 for the inscription of the code $t$H in the register 317 when a signal 24V appears.

The output 1 of the flip-flops 388 (signal OCI) and 385 (signal VL) are applied to one of the inputs of the AND circuits 389 and 386 which are activated by a signal H. The output conductors 26C and 26L of these AND circuits are connected to the circuit 560 (FIGURE 10).

When one of the two flip-flops 388 or 385 is set to the 1 state (apparition of a signal OCI or of a signal VL) an execution order F is elaborated by the circuit 210 and transmitted to the common control circuit 499. The circuit 499 transmits then an order H which is applied to the AND circuits 386 and 389 and the existing condition VL or OCI, is transmitted to the circuit 560.

When there is no free channel at all on the trunk, the duration of the signal OCI is of one frame period. When there is at least one free channel, the code search may last from one to $n1$ or $n2$ frame periods according to whether it takes place in a row trunk or in a column trunk.

The data search operations controlled by a phase signal EII during which the circuit 480 (FIGURE 2) selects the path stores of the row trunk JR and of the column trunk JC, the codes of which are stored in the registers 317 and 313 (FIGURE 10) will be described now.

As it has been seen during the study of the circuit 210 (FIGURE 5) the phase signal EI is elaborated in the time $t25.2$ and is used only for enabling to set up the phase EII to start from the first following time $t$H, for reasons which will be explained further on. If for instance $tH=t8$, the phase EII is elaborated in $t8$ and lasts up to $t9$ of the following frame period, since the phase EIII starts also at the time $t$H. The phase EI lasts thus, at the maximum, one frame period and the phase EII slightly more than one frame period. The phase EII is the common free channel time slot $t$C search phase on the two trunks whose codes are registered in the block 310. It is a data search operation of the type M*b*.

This search is performed in the channel time slot marking circuit 360 (FIGURE 8) which is also used for the marking of the channel time slot $t$D during the performance of an order D.

The signal which initiates the operation of the circuit is supplied on the conductor 17B, by the data search common circuits 340 (FIGURE 7). In this circuit, the outputs of the zero code detectors 342 and 346 are applied to the AND circuit 349 which delivers a signal when, at a given channel time slot of the phase EII, the time path stores of the two trunks JR and JC do not deliver simultaneously any code number: this signal thus characterizes a common free channel time slot on the two trunks and it is transmitted to the OR circuit 299 the output of which is connected to the conductor 17B.

The OR circuit 299 comprises two other inputs activated during the phases DCI (AND circuit 344) and DRI (AND circuit 347). The mode of elaboration of the signals applied thereto will be examined during the study of the order D.

The signal 17B is applied to one of the inputs of the AND circuit 364 (FIGURE 8) which receives, on a second input, a signal 21 delivered by the flip-flop 366 in the 0 state and on a third input the channel time slot codes 30 supplied by the clock 600. When the AND circuit is activated, the signals 30 are transmitted to the OR circuit 365 and are stored in the register 362 set to zero beforehand by the order L.

The code stored in the register 362 is transmitted, first, to the zero code decoder 363 and, second, to one of the inputs of the comparator 361 for comparison with the codes 30 applied to its second input. The output of the decoder 363 is connected to the 1 input of the flip-flop 366 through the inverter 359.

Before the apparition of the order E, the order L resets to zero the register 362 and resets the flip-flop 366 to the 0 state. The decoder 363 delivers then a signal which is inverted by the inverter 359 so that no signal at all is applied on the 1 input of the flip-flop, the state of which is not modified. The input 21 of the AND circuit 364 is thus activated permanently.

When during the phase EII a signal 17B appears which characterizes a free channel time slot common to both trunks, the AND circuit 364 becomes activated and the channel time slot code which is present at this time on the group of conductors 30 is transferred to the register 362. The decoder 363 delivers then a signal which, after passage in the inverter 359, sets the flip-flop 366 to the 1 state so that the AND circuit 364 is blocked up to the next order L. The setting to the 1 state of this flip-flop means that a free channel time slot code $t$C common to both trunks, has been stored in the register 362.

This code is no more modified and it is transmitted to the common control circuit on the group of conductors 26D when a signal H is applied to the multiple AND circuit 391 and is stored in the register 519 (FIGURE 10).

When the following order is an order A, the multiple AND circuit 529, placed in the common control circuit, is activated under the action of the signal Ao (operating through the OR circuit 579) and this code is sent back to the channel time slot marking circuit on the group of conductors 27D. It is stored, after passage through the OR circuit 365, in the register 362, reset to zero by the order L which has preceded said order A and the comparator 361 delivers once again a signal during the channel time slot $t$C on the conductor 18.

It has been seen, during the study of the circuit 210 (FIGURE 5), that the phase EI started in $t25.2$ and that it ended in $t$H.1 and that the phase EII started in $t$H.2 in order to end at the time $t$H.1 the following frame period so that it lasted one frame period.

If at the end of this frame period, the flip-flop 366 is still in the 0 state, this means that no common free channel time slot has been found. This condition is transmitted at the time $t$H.1 of the phase EII (AND circuit 367) to the flip-flop 368 which sets to the 1 state and delivers an occupation signal OC2. This signal is transmitted, when an order signal H activates the AND circuit 369, to the common control circuit 499.

The channel time slot $tC$ is the setting-up channel time slot of the connection in the switch 100 (FIGURES 2 and 3). If for instance $n1=n2$, the switch will be able to set up, at the maximum $n1$ connections, per channel time slot. During the successive setting up of a certain number of connections, several of these may then use the same time $tC$. Since on the other hand, the number of trunks associated to one switching stage is chosen in such a channel as each trunk has still available, at the busy time, a certain number of free channels, there would be an appreciable probability that the setting-up times of the different connections, be grouped around the channel time slot of elaboration of the signal EII if this latter was fixed in the time. It is the reason why this phase starts in $tH$ so that this time modifies itself at each frame period.

A last operation of data search consists in the identification of a path under the control of an order D. It has been seen, during the study of the phase signals generator 210 (FIGURE 5) that the logical block 220 delivered orders DC (search of column trunk codes) or orders DR (search of row trunk codes) according to whether one or the other of the flip-flops 213 or 214 was in the 1 state (signal Q1 or Q2).

These flip-flops are controlled by the signals Z5 and Z6 delivered by the zero code decoders 323 and 327 (FIGURE 10) placed in the block 310 and which are respectively associated to the registers 313 (code JC) and 317 (code JR).

It has also been seen, during the study of the block of registers 500 of the common control circuit 499 that two codes were transmitted to the marker in the same time as the order D, i.e. either a channel code and a row trunk code or a channel code and a column trunk code. In the first case, a code is stored in the register 317 and the decoder 327 delivers a signal $\overline{Z6}$, and in the second case, a code is stored in the register 313 and the decoder 323 delivers a signal $\overline{Z5}$. These signals are applied respectively to the flip-flops 213 and 214 through the inverters 215 and 216 (FIGURE 5) so that one flip-flop sets to the 1 state when the corresponding register has shown out a code.

The marking of the channel time slot $tD$ is performed in the channel time slot marking circuit 360 (FIGURE 8) in accordance with informations elaborated in the data search common circuit 340 (FIGURE 7).

This operation, which is of the type M$a$, is performed during the phases DCI and DRI.

The signal 17B delivered by the OR circuit 299 which induces the operation of the circuit 360 is supplied by one of the comparators 341 or 345 of the block 340. If one is, for instance, in phase DCI, the channel code in the row trunk stored in the register 311 is compared to the codes transmitted to the block 340 on the conductors 58–2, 56–2, 54–2 connected to the time path store of this row trunk. The apparition of a signal 17B means that the two codes are identical and thus that the channel time slot at which this identity is set up is the channel time slot $tD$ of flowing of the communication. The outputs of the comparators are applied to the OR circuit 299 through the AND circuits 344 and 347 which are respectively activated in DCI and DRI.

The duration of a phase DRI or DCI is thus one frame period.

The time signal $tD$ is shown up on the conductor 18 of the circuit 360 (FIGURE 8) in the same manner as a signal $tC$.

The phases DCII or DRII are reserved to the search of the unknown trunk code and, during the phase DCII, a row trunk is selected while, during the phase DRII, many row trunks are selected successively. In the phase DCII, the space path store of the row trunk, the code of which is known, is selected and the column trunk codes which are stored therein are transmitted on the conductors 58–4, 56–4, 54–4 to the multiple AND circuit 352 (placed in the block 340) which is activated at the channel time slot $tD$ of this phase DCII. The operation of data search which is performed is of the type K$a$. The code received at this channel time slot is the code of the column trunk connected with the row trunk the code of which is known. It is transmitted to the block 310 (FIGURE 10) of the conductor 59–4, and stores in the register 313 after passage in the multiple OR circuit 314. The duration of the phase DCII is thus of one frame period.

During the phase DRII, the data search is also carried out by a consultation of the column trunk codes, but it is necessary in this case, to examine the different space path stores in a cyclic channel since no row trunk code is available. The operation performed is of the type K$b$. The cyclic examination is controlled by the row trunk code 40 delivered by the circuit 270 (FIGURE 6) and it will be reminded that this code advances by one position at each time $t25.4$. It is applied to the decoder 487 during the phase DRII (AND circuit 414) placed in the circuit 410 (FIGURE 7), in order to select the corresponding row trunk. The codes of the column trunk transmitted over the groups of conductors 58–4, 56–4 and 54–4, from the selected space path stores, are applied to the circuit 343 in which they are compared to the known column trunk code stored in the register 313 (FIGURE 10) and transmitted over the group of conductors 53–3. At each frame period, the code 40 advances by one position and a new space path store is selected and this cyclic examination proceeds up to the time when the comparator 343 (FIGURE 7) delivers a signal on its output. The apparition of this signal means that at this channel time slot, the column trunk the code of which is known is connected with the row trunk the code of which is available on the group of conductors 40 during this frame period. The output conductor of the comparator 343 is connected to a first input of the multiple AND circuit 353 placed in the block 340 which comprises two other inputs activated in DRII and at the time $tD$. If the signal 28 appears at the time $tD$, the selected row trunk is the one searched for. The AND circuit is activated and it transmits, on the conductor 59–8, the row trunk code applied on its outputs 40 to the OR circuit 318 placed in the block 310 (FIGURE 10) and this code is stored in the register 317. The duration of a phase DRII is thus at the maximum of $n1$ frame periods.

The phases DCIII and DRIII consist in searching for the channel code in the trunk, the code of which has just been found during the phase II. It is an operation of the type K$a$. During this phase, the trunk whose code has just been found is selected and the codes extracted from the time path store of the trunk are applied to a multiple AND circuit which is activated at the channel time slot $tD$ (AND circuits 351 and 354). The channel code appearing at this time slot is the searched code and it is transmitted to the block 310 on the groups of conductors 59–2 or 59–6 in order to be stored in the corresponding register (311 or 315). The duration of one phase DCIII and DRIII is thus of one frame period.

The channel time slot signal $tD$ is available on the conductor 18 during the three operation phases of the order D. At the apparition of an order H, it is transmitted to the common control circuit in the same channel as the signal $tC$.

When the next order is B, the code is returned back to the circuit 360 in the same channel as the signal $tC$ (logical circuits 579 and 529, FIGURE 10).

The operations performed under the control of each of the order signals having been described, one will give now the succession of order signals delivered by the common control circuit to the marker stage, in two classical cases of telephone exploitation.

In the case of the setting up of a connection, one will assume for instance, that a calling subscriber which has access to a switching stage through a channel VC of an incoming trunk JC (connected for instance to a column of the switch) has transmitted to a recorder the number of the called subscriber. The codes JC and VC are then transferred to the common control circuit and are stored in the registers 523 and 525 (FIGURE 10) with a service information indicating the aim for which all these informations have been gathered in the common control circuit, i.e. the setting up of a connection towards a called subscriber.

After consulting an associated circuit, the common control circuit determines, from the number of the called subscriber, an outgoing trunk JR having access to the called subscriber and, as soon as it possesses this information, it stores it in the register 517 and elaborates successively the following orders:

L (liberation of the marker)
C*o* and C (free channel search on the trunk JR).

After reception of the signal F indicating the end of the operation C, the common control circuit transmits an order H to the marker. Two cases may then occur, according to whether a signal 26C or a signal 26L is stored in the circuit 380 (FIGURE 9):

(1) The logical block 560 receives a signal 26C indicating that no free channel at all has been found on the trunk JR. The common control circuit may then either control a new operation C on another outgoing trunk giving access to the called subscriber, or control the transmission, to the calling subscriber, of a "busy signal" indicating that the communication cannot be set up.

(2) The logical block 500 receives a signal 26L indicating that a free channel has been found and that its code has been stored in the corresponding register (register 311 in the case of the example). It elaborates then successively, the following orders:

L (liberation of the marker)
E*o* and E (search of the free channel time slot for the setting up of the connection).

After reception of the signal F which indicates the end of the operation E, the common control circuit transmits an order H to the marker stage. Two cases may then occur:

(1) A particular signal 26–0 stored in the circuit 360 (FIGURE 8) is transmitted to the logical block 560 (FIGURE 10) indicating that there is no free channel time slot on the trunk JR.

This latter may then either control a new operation C on another row trunk giving access to the called subscriber, or control the transmission, to the calling subscriber, of a busy signal.

(2) If the block 560 does not receive a signal 26–0, it elaborates successively the following orders:

L (liberation of the marker)
A*o* and A (data inscription) and after reception of the signal F it either sends or not an order H to the marking stage.

In the case of the breaking of a connection, the control circuit receives, from an associated circuit, informations made up for instance, of the code of a column trunk JC and the code of a channel VC on this trunk as well as a service information indicating to the common control circiut that the connection set up with the channel VC of the trunk JC must be broken. The mentioned associated circuit may be constituted, for instance, by a circuit which explores the channels of the different trunks and detects the arrival of a particular code characterizing an order of cut-off of traffic connection or an associated circuit information the common control circuit that a service connection must be interrupted. As soon as this information is received, the common control circuit controls the following operations:

L (reset to zero of the marker circuit)
D*o* and D (path identification).

After reception of the signal F characterizing the end of the operation, it transmits to the marker stage the orders:

H (re-copy of the informations obtained during the operation)
L (re-setting to zero of the marker circuit)
B (inscription of the zero code in the path stores at the addresses where the trunk and channel codes characterizing the connection which must be interrupted were written).

The common control circuit has been described only for explaining how the marker stage operates in some simple cases of telephone exploitation. However it will be understood that, in a telephone exchange, such a circuit would have other functions and that systems can be imagined in which the same marker stage associated to an identical switching stage would receive from the common control circuit a more complex succession of orders than that described in the case of the setting up or of the cutting-off of a connection. However such a description is out of the scope of the present invention.

While the principles of the above invention have been described in connection with specific embodiments and particular modifications thereof it is to be clearly understood that this description is made by way of example and not as a limitation of the scope of the invention.

What is claimed is:

1. In a time-division multiplex telephone switching system, a plurality of row trunks and a plurality of column trunks with each trunk comprising an incoming and an outgoing multiplex transmission line and with each transmission line having a plurality of time-division multiplex channels thereon corresponding to equal time intervals, a plurality of incoming data stores for respective ones of said channels on said incoming transmission lines, outgoing data stores for respective ones of said channels on said outgoing transmission lines, time path stores for respective channel time intervals and space path stores for storing column trunk identity data, switching means, means for controlling said switching means to extend a time-division connection from a calling one of said channels to a called one of said channels in accordance with the column trunk identity data stored in the said space path stores, and means for transferring data over said established connection between the data stores associated with the incoming transmission line channels and the outgoing transmission line channel during a portion of one said time interval and for transferring data over said connection between the outgoing data stores and the outgoing transmission lines during a different portion of said time interval.

2. A time-division multiplex telephone switching system as set forth in claim 1, wherein clock means is provided for generating control signals indicative of recurrent frame periods of equal duration with each frame period being divided into the said equal channel time intervals, means for writing data received over incoming transmission lines, at each frame period, in the data store of the channel corresponding to the channel time interval, and means for extracting successively and cyclically at each frame period, the data written in said outgoing data stores for its said transmission over the associated outgoing transmission line.

3. A time-division multiplex telephone switching system as set forth in claim 2, wherein means is provided for storing a code indicative of each channel during the corresponding time interval in the respective time path stores, and wherein means is provided for successively and cyclically extracting the said stored channel code stored in said time path store.

4. A time-division multiplex telephone switching system as set forth in claim 3, wherein circuit means are provided for each said column and row trunk line; said circuit means including a plurality of each of said incoming and outgoing data stores, the output of said incoming data stores and the input of said outgoing data stores in each said circuit means being connected in parallel, with the said parallel connection of said column trunk circuit means comprising an access terminal and the parallel connection of said row trunk circuit means comprising an output terminal, and the said means for controlling the switching means including means for interconnecting said access terminal of the calling row trunk with the said output terminals of the column trunks in accordance with the said code stored in said space path stores.

5. In a switching system according to the claim 1, the said means for controlling the said switching means comprising in combination a plurality of input registers for the storage, respectively, of a row trunk code, of a row trunk channel code, of a column trunk code, of a column trunk channel code, and of a free channel time interval common to the said row trunks, means operable responsive to the incomplete storage in said input registers for initiating a data search operation to complete said incomplete storage, an order register for storing a code indicative of the type of the switching operation to be carried out in accordance with the codes stored in the input registers, means for generating a succession of row trunk codes which, at a given frame period, indicate the next successive row trunk code, and selective access means associated with each one of the said path stores of each one of the trunks associated with the said switch in order to selectively connect said switch controlling circuit to the outputs of said stores for carrying out said data search, and to the input of said stores for writing codes therein.

6. In a switching stage according to claim 5, means operable in the said order register, and to the writing of the trunk code in one of said registers for controlling the said selective access means, free channel detection means in the said trunk comprising a zero code decoder operable in response to the codes read in a cyclic way from the said time path store for delivering a signal at each channel time interval for which the last said trunk is free, means for generating a busy signal responsive to failure of the said signal from the zero decoder, means for generating a search completion signal when said busy signal is present at the end of the first frame period, means in response to said search completion signal for transferring the busy signal to the switch controlling means, means for generating a random channel time interval code comprising a counter which stores the channel time interval code immediately higher than that stored during the preceding frame period, means for comparing the said codes read cyclically from the time path store with the said random channel time codes and for generating a signal indicative of the equality of the two codes, means for storing the said equality signal generated during a given frame period, means activated at the end of said frame period when no said equality signal is stored for generating a free channel signal and for writing the free channel code during the said frame period, and means responsive to the said free channel signal and said search completion signal for transferring said free channel signal to the switch controlling means.

7. In a switching stage, according to claim 5, means operable in response to the writing of a search order in the said order register indicative of free channel time interval common to a row trunk and to a column trunk, and to the writing of the codes of the last said trunks respectively in the said input registers, for controlling the selective access means to connect the output of the time path store of the trunk to the input of a first zero code detector during a frame period and to connect the output of the trunk to the input of the time path store of the trunk to the input of a second zero code detector during a frame period, a coincidence detection circuit for generating a free channel time interval signal when said decoders simultaneously deliver a signal, marking means comprising a marking register for storing the channel time interval code generated by the said exchange clock during the appearance of said free channel time interval signal, and means responsive to said search completion signal for transferring the contents of the marking register to the said input registers.

8. In a switching stage according to claim 7, means for writing a row trunk search order in the said order register, means for writing the trunk codes in the said column trunk and row trunk registers, comparison means for comparing the channel codes read cyclically in said time path store with the trunk channel code stored in the column trunk channel register, the channel time interval at which the said comparator delivers said equality signal being the flow channel time interval in the switching means of the connection set up on the channel, column trunk means for applying said equality signal to the marking means in order to write, in the marking register, the channel time code delivered at this moment by the said exchange clock, means for comparing the code written in the last said register with the succession of the channel time codes delivered by said exchange clock, means acting from the second frame period of said row trunk search order for selecting successively the codes delivered by the said cyclic generator of the row trunk codes, the code of the said space path stores of the row trunks associated with the switching means, and the column trunk codes read in said space path stores associated with the said column trunk register, coincidence means activated responsive to said equality signal for controlling the writing of the code generated by the cyclic generator means for connecting the said selective access means to the time path store of said row trunk, writing means in the said row trunk channel register for writing the code of the channel connected at the time of the appearance of the equality signal, and means responsive to said search completion signal for transferring, to the said switch controlling circuit, the codes stored in all of the said row and column trunk and channel registers.

References Cited by the Examiner

UNITED STATES PATENTS

| | | | |
|---|---|---|---|
| 2,947,818 | 8/1960 | Ward | 179—18.9 |
| 2,955,165 | 10/1960 | Budlong et al. | 179—18.9 |
| 3,029,311 | 4/1962 | Ward | 179—15 |

DAVID G. REDINBAUGH, *Primary Examiner.*

ROBERT L. GRIFFIN, *Examiner.*

T. G. KEOUGH, *Assistant Examiner.*